(12) United States Patent
Dolgov et al.

(10) Patent No.: US 11,204,813 B2
(45) Date of Patent: *Dec. 21, 2021

(54) SYSTEM AND METHOD FOR MULTIDIMENSIONAL SEARCH WITH A RESOURCE POOL IN A COMPUTING ENVIRONMENT

(71) Applicant: Oracle International Corporation, Redwood Shores, CA (US)

(72) Inventors: Yuri Dolgov, San Jose, CA (US); Douglas Surber, Orinda, CA (US); Jean De Lavarene, Levallois Perret (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,555

(22) Filed: Oct. 12, 2020

(65) Prior Publication Data

US 2021/0034437 A1 Feb. 4, 2021

Related U.S. Application Data

(63) Continuation of application No. 15/878,606, filed on Jan. 24, 2018, now Pat. No. 10,802,890, which is a
(Continued)

(51) Int. Cl.
*G06F 9/52* (2006.01)
*G06F 9/50* (2006.01)
(Continued)

(52) U.S. Cl.
CPC ............ *G06F 9/526* (2013.01); *G06F 9/5011* (2013.01); *G06F 9/5016* (2013.01);
(Continued)

(58) Field of Classification Search
CPC .... G06F 9/526; G06F 16/245; G06F 16/2246; G06F 16/283; G06F 9/5011;
(Continued)

(56) References Cited

U.S. PATENT DOCUMENTS 7,418,506 B1 * 8/2008 Achtermann ........... H04L 67/14
709/227
7,827,375 B2 * 11/2010 Abrashkevich ....... G06F 11/366
711/170
(Continued)

OTHER PUBLICATIONS

Gieseke, Fabian et al., "Buffer k-d Trees: Processing Massive Nearest Neighbor Queries on GPUs", Proceedings of the 31st International Conference on Machine Learning, Beijing, China, 2014. JMLR: W&CP vol. 32. Copyright 2014, 9 pages.
(Continued)

*Primary Examiner* — Jerry B Dennison
(74) *Attorney, Agent, or Firm* — Tucker Ellis LLP

(57) ABSTRACT

In accordance with an embodiment, a system enables multidimensional search within a resource pool, to support complex borrow operations such as, for example, specifying ranges for particular connection properties. As threads access the pool, attempting to borrow connections having particular connection properties, one or more skipped pool elements can be represented as skip lists within a k-dimensional tree (KD-tree) or other data structure that enables searching across multiple dimensions. In response to receiving a request to borrow a connection having particular connection properties, a multidimensional search can be performed within the KD-tree to determine the availability of a connection having the requested properties.

15 Claims, 22 Drawing Sheets

Related U.S. Application Data continuation-in-part of application No. 15/215,372, filed on Jul. 20, 2016, now Pat. No. 10,313,477.

(60) Provisional application No. 62/194,734, filed on Jul. 20, 2015, provisional application No. 62/450,305, filed on Jan. 25, 2017.

(51) Int. Cl.
  *G06F 16/245* (2019.01)
  *G06F 16/28* (2019.01)
  *G06F 16/22* (2019.01)

(52) U.S. Cl.
  CPC ........ *G06F 16/2246* (2019.01); *G06F 16/245* (2019.01); *G06F 16/283* (2019.01); *G06F 16/2264* (2019.01); *G06F 2209/5011* (2013.01); *G06F 2209/5014* (2013.01)

(58) Field of Classification Search
  CPC .............. G06F 9/5016; G06F 16/2264; G06F 2209/5011; G06F 2209/5014
  See application file for complete search history.

(56) References Cited

U.S. PATENT DOCUMENTS

| | | | | |
|---|---|---|---|---|
| 8,966,494 | B2* | 2/2015 | Makljenovic | G06F 9/526 718/104 |
| 2004/0221120 | A1* | 11/2004 | Abrashkevich | G06F 12/023 711/170 |
| 2006/0225077 | A1 | 10/2006 | Anderson | |
| 2007/0136385 | A1* | 6/2007 | Abrashkevich | G06F 11/366 |
| 2008/0163174 | A1 | 7/2008 | Krauss | |
| 2009/0137228 | A1 | 5/2009 | Horn et al. | |
| 2009/0172687 | A1 | 7/2009 | Bobak et al. | |
| 2014/0172790 | A1 | 6/2014 | Pathak et al. | |
| 2014/0379756 | A1 | 12/2014 | Shivarudraiah et al. | |
| 2017/0026242 | A1 | 1/2017 | Dolgov et al. | |
| 2017/0046182 | A1 | 2/2017 | Kogan et al. | |
| 2018/0150337 | A1 | 5/2018 | Dolgov et al. | |
| 2021/0173840 | A1* | 6/2021 | Yang | G06F 16/2255 |
| 2021/0209077 | A1* | 7/2021 | Snellman | G06F 16/219 |

OTHER PUBLICATIONS

"An Introduction to Lock-Free Programming", published Jun. 12, 2012, https://preshing.com/20120612/an-introduction-to-lock-free-programming, 12 pages.

Brown, Russell A., "Building a Balanced k-d Tree in O(kn log n) Time", Journal of Computer Graphics Techniques, vol. 4, No. 1, 2015, pp. 50-68, 19 pages.

Michael, et al., "Simple, Fast, and Practical Non-Blocking and Blocking Concurrent Queue Algorithms", Department of Computer Science, University of Rochester, 1996, 9 pages.

Oracle, "Connection Management Strategies for Java Applications using JDBC and UCP", Oracle Database 12c, Oracle White Paper, Jun. 2016, 30 pages.

Wikipedia, "k-d tree", modified on Jan. 19, 2017, retrieved from https://en.wikipedia.org/w/index.php?title=K-d_tree&oldid=760824333, 9 pages.

Wikipedia, "Non-blocking algorithm", https://en.wikipedia.org/w/index.php?title=Non-blocking_algorithm&oldid=667580799, Jun. 19, 2015, 4 pages.

Wikipedia, "Skip list", modified on Jan. 18, 2017, retrieved from https://en.wikipedia.org/w/index.php?title=Skip_list&oldid=760690710, 6 pages.

United States Patent and Trademark Office, Office Action dated Mar. 22, 2018 for U.S. Appl. No. 15/215,372, 11 pages.

United States Patent and Trademark Office, Notice of Allowance dated Sep. 24, 2018 for U.S. Appl. No. 15/215,372, 5 pages.

\* cited by examiner

SYSTEM AND METHOD FOR MULTIDIMENSIONAL SEARCH WITH A RESOURCE POOL IN A COMPUTING ENVIRONMENT

CLAIM OF PRIORITY

This application is a continuation of U.S. Patent Application titled "SYSTEM AND METHOD FOR MULTIDIMENSIONAL SEARCH WITH A RESOURCE POOL IN A COMPUTING ENVIRONMENT", application Ser. No. 15/878,606, filed Jan. 24, 2018, which is a continuation-in-part of U.S. Patent Application titled "SYSTEM AND METHOD FOR USE OF A NON-BLOCKING PROCESS WITH A RESOURCE POOL IN A COMPUTING ENVIRONMENT", application Ser. No. 15/215,372, filed Jul. 20, 2016, issued on Jun. 4, 2019 as U.S. Pat. No. 10,313,477 which claims the benefit of priority to U.S. Provisional Patent Application titled "SYSTEM AND METHOD FOR USE OF A NON-BLOCKING PROCESS WITH A CONNECTION POOL OR OTHER COMPUTING ENVIRONMENT", Application No. 62/194,734, filed Jul. 20, 2015; which application also claims the benefit of priority to U.S. Provisional Patent Application titled "SYSTEM AND METHOD FOR USE OF A NON-BLOCKING PROCESS WITH A RESOURCE POOL IN A COMPUTING ENVIRONMENT", Application No. 62/450,305, filed Jan. 25, 2017; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to the use of non-blocking processes with a resource pool, including the use of multidimensional search to support complex borrow operations such as specifying ranges for particular connection properties.

BACKGROUND

In many computing environments, resource pools can be used to provide access to resources which merit caching, since recreating those resources would be computationally expensive. Some examples of resource pools, and their pool elements, include database connections, memory buffers, or sections of memory that are computationally expensive to allocate.

For example, in an application server or other computing environment that includes a database connection pool, such as an Oracle Universal Connection Pool (UCP) environment, the connection pool acts as a resource pool that caches database connections, with each connection pool element associated with a corresponding software object that defines a connection. A software application can request a particular type of connection, and, if the connection pool includes a connection that can satisfy the request, that connection can be provided to the application in the form of access to the appropriate software object. The application can use the connection to perform some work, and then return it to the connection pool, so that it can be made available for subsequent requests, from the same or another application.

However, while some environments can synchronize access to a cache of many connections (for example, a first thread A may release a connection to the pool, while another thread B searches for a best connection in the pool), such model generally does not scale well. With software applications increasingly being deployed to larger enterprise or cloud environments, such systems can benefit in being able to scale, to support much larger numbers of threads.

SUMMARY

In accordance with an embodiment, a system enables multidimensional search within a resource pool, to support complex borrow operations such as, for example, specifying ranges for particular connection properties. As threads access the pool, attempting to borrow connections having particular connection properties, one or more skipped pool elements can be represented as skip lists within a k-dimensional tree (KD-tree) or other data structure that enables searching across multiple dimensions. In response to receiving a request to borrow a connection having particular connection properties, a multidimensional search can be performed within the KD-tree to determine the availability of a connection having the requested properties.

DETAILED DESCRIPTION

Figure 1:
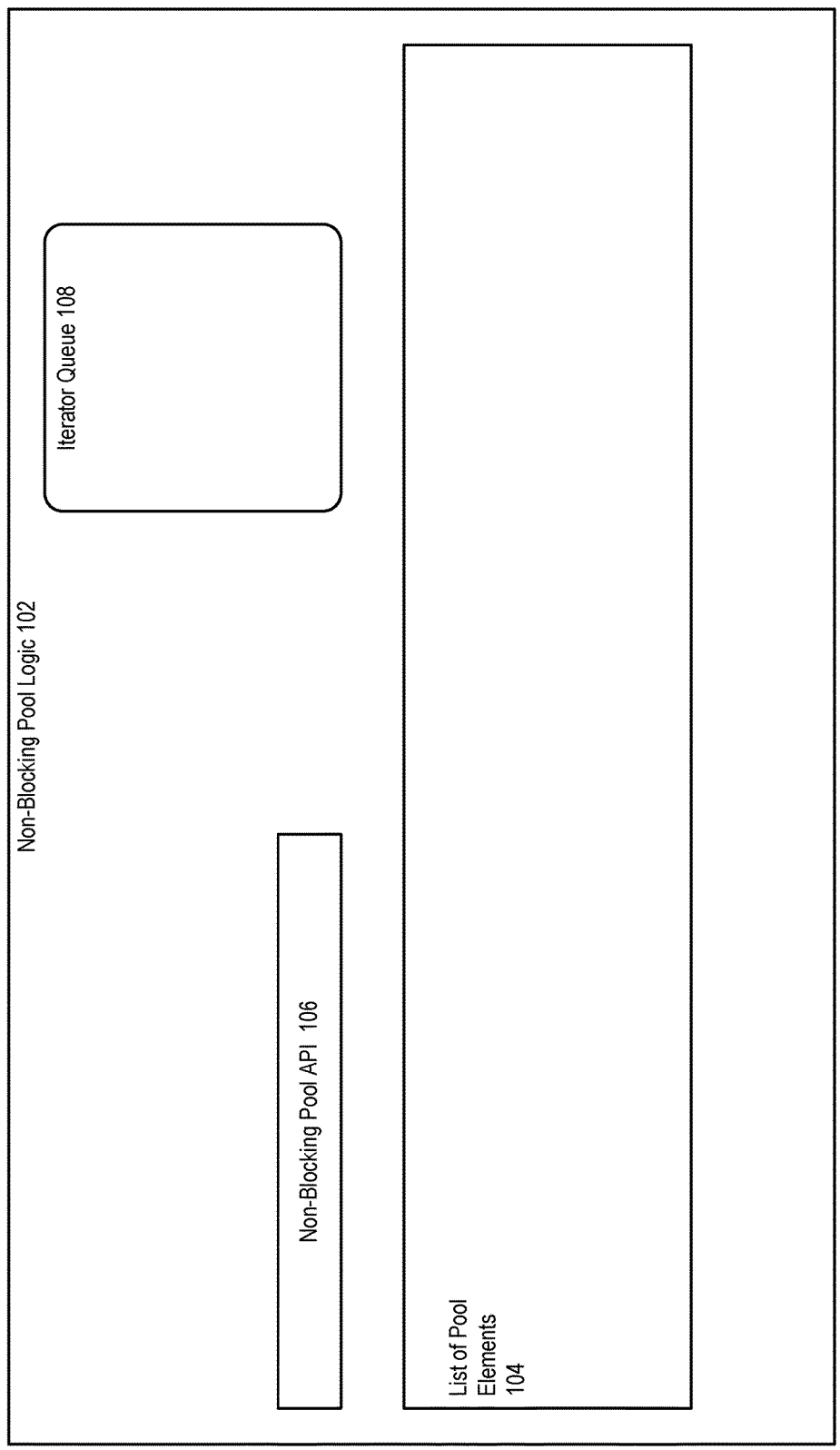
FIG. 1 illustrates use of a non-blocking process, in accordance with an embodiment.

As described above, in many computing environments, resource pools can be used to provide access to resources which merit caching, since recreating those resources would be computationally expensive. Some examples of resource pools, and pool elements, include database connections, memory buffers, or sections of memory that are computationally expensive to allocate.

In accordance with an embodiment, described herein is a system and method for use of a non-blocking process with a resource pool, for example a connection pool, or another type of computing environment. A generic wait-free approach can be used with a variety of different types of resource pools and pool elements. Threads which require access to a collection of resources do not have to wait for a lock on that collection of resources to become available. Although a borrowing thread may still be required to wait for a particular resource to be released, the wait-free approach allows the thread to browse through a list of available resources. The approach can be used with connection pools, or with other types of computing environments, to provide improved scalability in such systems.

For example, in accordance with an embodiment, the system enables a pool element that is associated with a data or other resource, to be reserved in a reliable manner, such that only one thread has entire access to that particular element for the duration of the reservation. During the reservation, other threads will be prevented from accessing that particular pool element. However, the reservation of a particular pool element by a thread, for the purpose of determining the suitability of its associated data or other resource, does not prevent those other threads from navigating through the remainder of the pool, potentially reserving and examining other pool elements.

Introduction to Resource Pools

In accordance with an embodiment, a pool can be viewed as a concurrent programmatic logic that manages pool elements and supports basic operations such as, for example: insert a pool element into the pool; remove a pool element from the pool; and iterate through the pool seeking a specific pool element. Pools can be used to manage access to data or other types of resources, in which case they are generally referred to herein as resource pools.

As described above, some examples of resource pool elements include database connections, memory buffers, or sections of memory that are computationally expensive to allocate. However, a resource pool can also be generalized, such that any object of any class can be considered a pool element.

Although some aspects of this functionality can be implemented using critical sections in the software application code, such an approach can lead to performance and scalability limitations. A critical section, for example one which finally translates into monitorenter and monitorexit Java virtual machine (JVM) pseudo code instructions, forces threads to wait to enter a monitor process, where those waiting threads are subject to thread re-scheduling and context-switching. Additionally, the critical section generally prevents other threads from performing work while one thread is within the critical section, which results in poor scaling performance when greater number of threads require access to the pool.

For example, in a connection pool environment that provides access to a connection pool or cache using a critical section, when a thread requests a connection, the connection pool or cache is generally locked, to find a best connection and return it, while other threads that may also want a connection are forced to wait.

As another example, a procedure to increment a counter may be configured to get a particular value, add "1" to it, and store the new value. Since multiple threads accessing the counter at the same time could cause corruption, the counter can be provided as a critical section, so that only a single thread can enter it at a time, to access the blocked data, while other threads are placed in a queue waiting. Context-switching can be used to idle and wake threads as they enter the critical section, which effectively operates as an atomic action by using several nonatomic actions.

The need for such blocking, queuing, and context-switching means that critical sections are often large, computationally expensive, operations. When a critical section is used in a multiprocessor environment, since only one thread is able to enter the critical section at a time, this means that other processors may remain idle while their threads are being held.

An alternative approach to the use of critical sections is to provide a wait-free, or lock-free, approach using a hardware operation such as compare-and-swap. In this approach, for example, a first thread can read a counter, increment it, and then perform a single hardware operation, which directs that, if the counter value is "X", then modify the content. Another thread can attempt the same operation, in such a manner that the winning thread wins, and the losing thread performs a re-read.

Since the above approach is performed as a single machine instruction, the likelihood of overlap is small. The threads can perform a while-loop, and spin while attempting to increment the counter; although in practice, with small operations, such operations do not spin very long. Since there is no queue and no context-switch, the timing is small compared with the hundreds of lines of code in a typical critical section.

Non-Blocking Process

As described above, with software applications increasingly being deployed to larger enterprise or cloud environments, such systems can benefit in being able to scale to support much larger numbers (e.g., thousands) of threads, such as, in the example of a connection pool, the ability to handle concurrent access to the connection cache by several threads.

In accordance with an embodiment, an additional pool operation is supported that allows a borrowing thread to reserve a pool element, so that the thread can inspect that pool element to make a determination as to whether the pool element should be subsequently borrowed.

As described herein, in accordance with an embodiment, the action of "reserving" a pool element generally means "reserve to inspect" the element, such that a thread reserves and inspects a particular element, because it is considering whether to borrow or otherwise use that particular element. Generally, a thread will reserve a pool element during a very short period of time. If the thread then determines to borrow the pool element, it will remove that element from the pool of available elements. The borrowed element leaves an empty cell in the resource pool, which can be used if necessary during a subsequent pool insert operation.

Additionally, in accordance with an embodiment, the resource pool is linearly-organized, including that the pool element reservation order is generally provided on a first-come-first-served basis for participating threads; threads are never blocked by reserved pool elements; and a participating thread has the option to revisit a reserved pool element when that pool element is released.

The described approach provides for reliability of a pool element's reservation, such that only a single thread will have entire access to a particular pool element for the duration of its reservation. During the period or duration of reservation, other threads will be prevented from accessing that particular pool element. However, the reservation of a particular pool element by a particular thread, for the purpose of determining the suitability of its associated data or other resource, will not prevent those other threads from navigating through the remainder of the pool, potentially reserving and examining other pool elements.

In accordance with an embodiment, the described approach implements a non-blocking process including the use of atomic references with compareAndSet operations, which can be translated into native hardware compare-and-swap spinlock instructions. This enables the system to avoid using monitorenter and monitorexit pseudocode instructions; and instead use spinlocks which are atomic references in Java.

In accordance with an embodiment, an atomic reference can be provided by a class in the Java class library that implements an update operation using compareAndSet. One means of accomplishing this is to set a value if something is null. For example, with Java this can be indicated as "if field-equals-null then field equals new-value". However, in a multithreaded environment, by the time a thread can complete this operation, another thread could have changed the value. To address, this, an atomic reference can be used to test equal-to-null and set to a new value that is performed at the hardware level, for example by determining a bit pattern that appears as null, and setting it to a bit pattern of the new value.

FIGS. 1-10 illustrate use of a non-blocking process, in accordance with an embodiment.

As illustrated in FIG. 1, in accordance with an embodiment, a system can include or provide a non-blocking pool logic 102, which when executed by a computer enables access to a resource pool or other list of pool elements 104, via a non-blocking pool application program interface (API) 106. The non-blocking pool logic also supports the use of an iterator queue 108, as further described below.

In accordance with an embodiment, each pool element within the list of pool elements can be associated with a chunk or region of memory, and contain a reference to a next pool element, a flag to indicate that the pool element is reserved (for example, by containing either a null, or a reference to an iterator that has currently reserved this pool element), and a data block or field that points to a data or other resource to be cached, for example a connection or other software object.

For example, in a connection pool environment, each pool element can act as a holder for a particular type of connection, which in turn can be used to perform some work, e.g., at a database.

Figure 2:
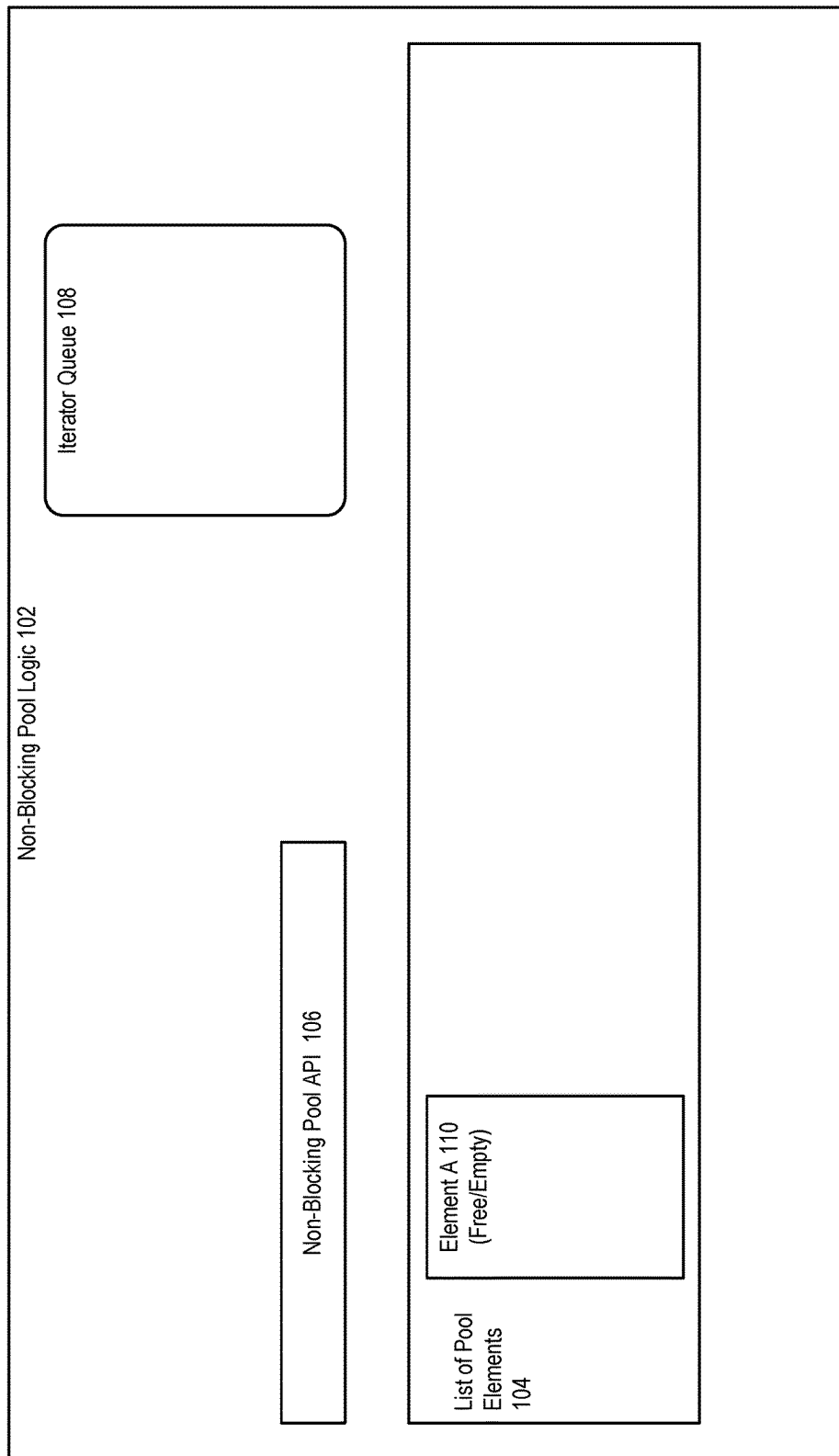
FIG. 2 further illustrates use of a non-blocking process, in accordance with an embodiment.

As illustrated in FIG. 2, a pool element A 110, which is inserted or otherwise added to the resource pool, can be initially provided as a free or empty pool element, such that the element is not currently associated with a particular data or other resource, nor is the element currently reserved by an application thread.

Figure 3:
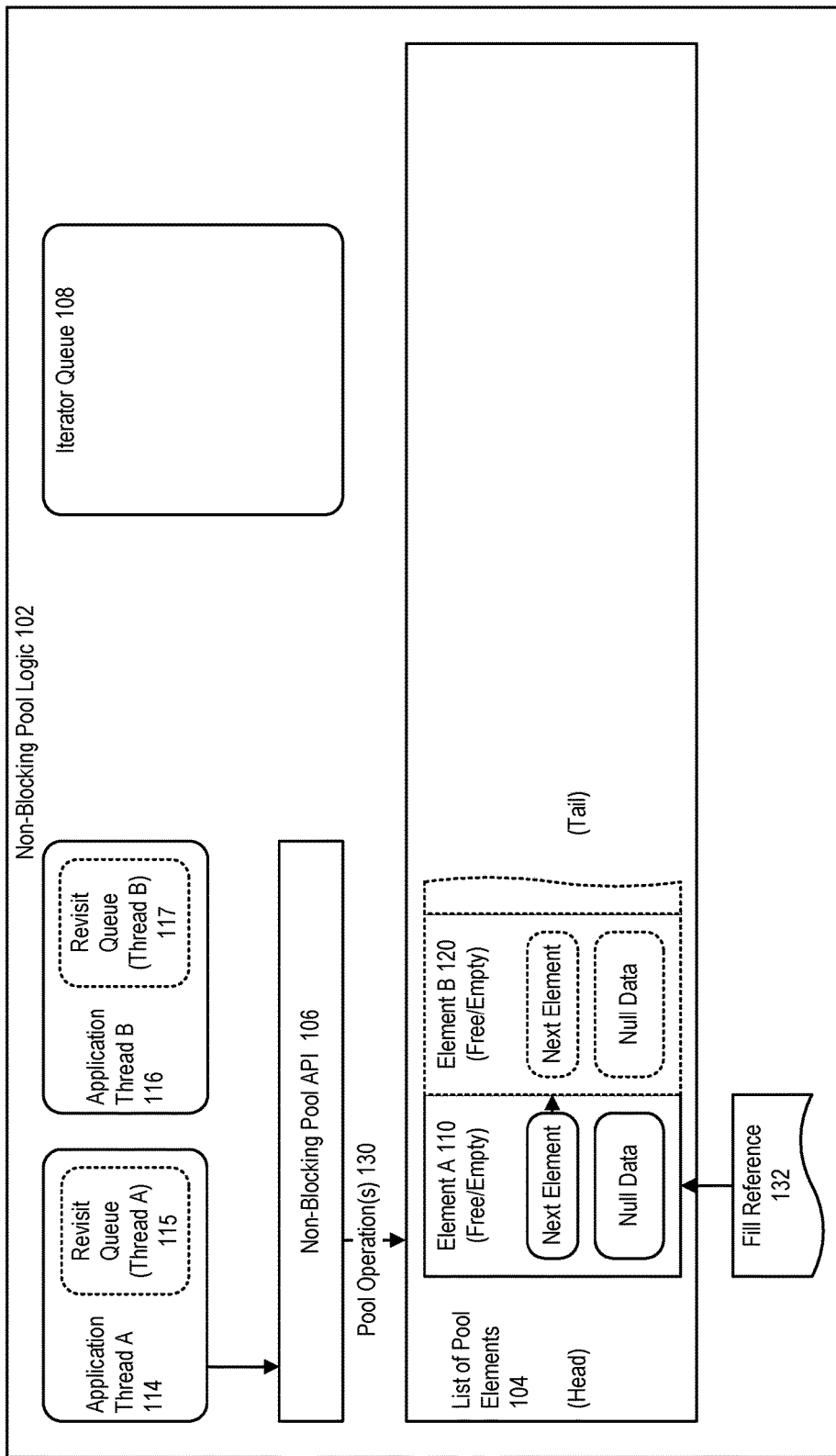
FIG. 3 further illustrates use of a non-blocking process, in accordance with an embodiment.

As illustrated in FIG. 3, additional pool elements including, for example, pool element B 120, can be similarly inserted or otherwise added to the resource pool, and can be similarly initially provided as free or empty pool elements.

In accordance with an embodiment, the list of pool elements within the resource pool can have a list head, and a list tail. When a thread associated with a calling application, for example one of application threads A 114 or B 116, each of which are associated with their own revisit queues 115, 117 respectively, wants to insert a pool element into the list, using one or more operations 130 at the pool's API, the non-blocking logic can parse through the one-directional list of pool elements to determine an appropriate insertion point.

In accordance with an embodiment, optionally a fill reference (fillRef) 132 can be used to point to the first vacant pool element (i.e., with a data field=null) in the list. Pool elements are generally not removed from the list, which is instead extended as necessary, and can be reserved on a one-by-one basis: if a pool element is already reserved, then it can be ignored, otherwise for a pool element to be reserved, the thread can examine the pool element's data field, and use it by modifying it accordingly.

In accordance with an embodiment, the system can use atomic references, implemented as compareAndSet operations, to ensure that another thread cannot insert a new pool element into the list at the same time, or compete to reserve the same pool element. In accordance with an embodiment, these atomic references can be translated into native hardware compare-and-swap spinlock instructions.

Figure 4:
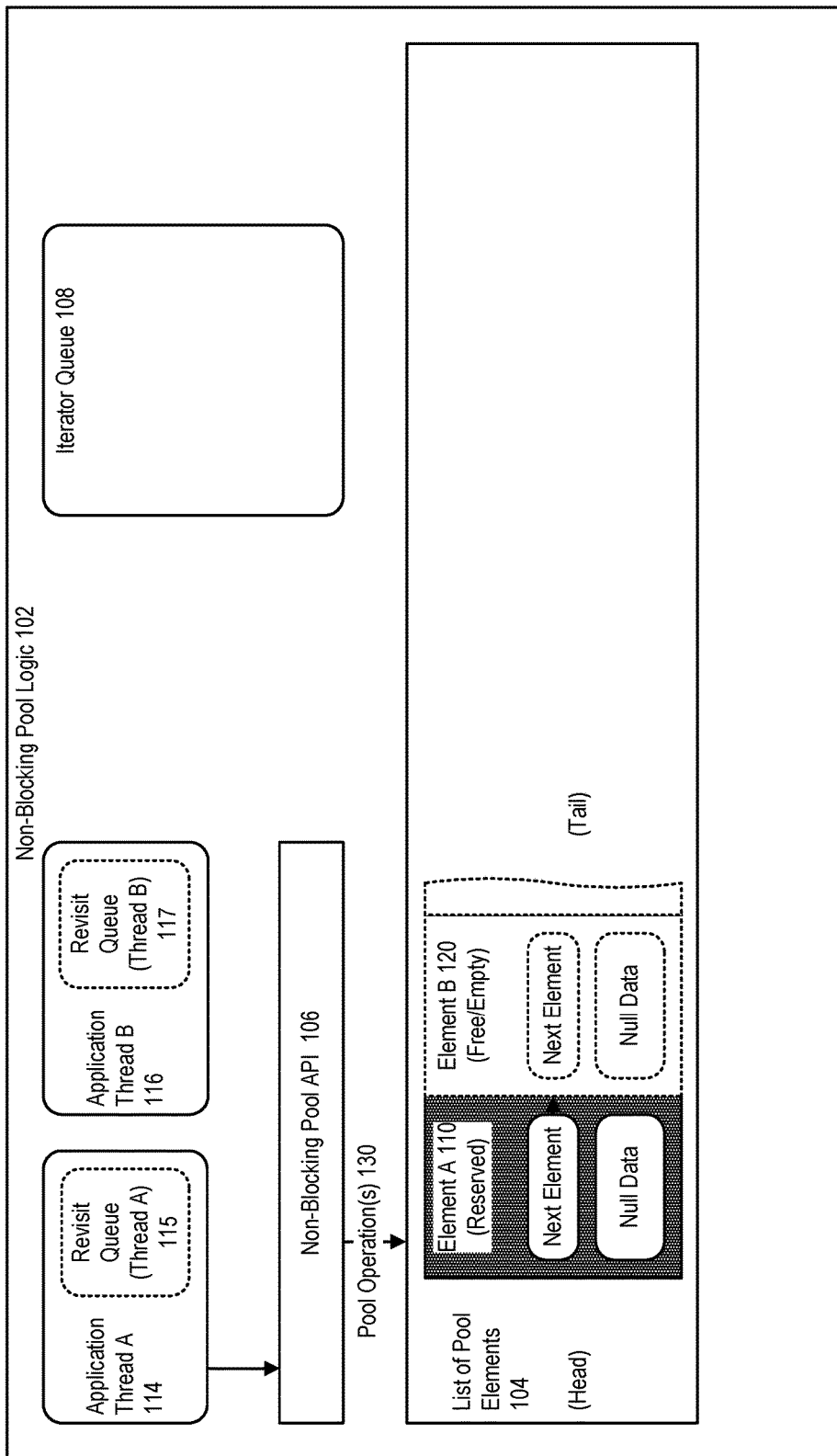
FIG. 4 further illustrates use of a non-blocking process, in accordance with an embodiment.

As illustrated in FIG. 4, a calling thread can reserve a particular pool element, in this example, pool element A, which can be flagged to indicate that the pool element is currently reserved.

In accordance with an embodiment, once a pool element is reserved, other threads can ignore that pool element during the reservation period. When a pool element is reserved by a thread, this does not necessarily mean that the element is checked-out or borrowed (for example, in the manner that a database connection might be checked-out or borrowed by a calling application, to perform some work at the database); but instead means that the thread is considering the pool element for its use, and may, or may not, continue to check-out, borrow, or otherwise use it. Other threads can skip that pool element for now, but they may return later and attempt to retrieve it.

In an exemplary embodiment, which supports the use of a connection pool to access database connections, during the borrowing of a connection, the system allows a thread to reserve a pool element, ensure the element is not currently borrowed, mark the element as borrowed, and then release the element, leaving it in the same resource pool. In such an environment, a pool element is removed from the pool only when that element's associated connection is closed. In this regard, the reservation of a pool element, e.g., one associated with a connection, is not the same as, for example, the checking out of that element's connection.

Figure 5:
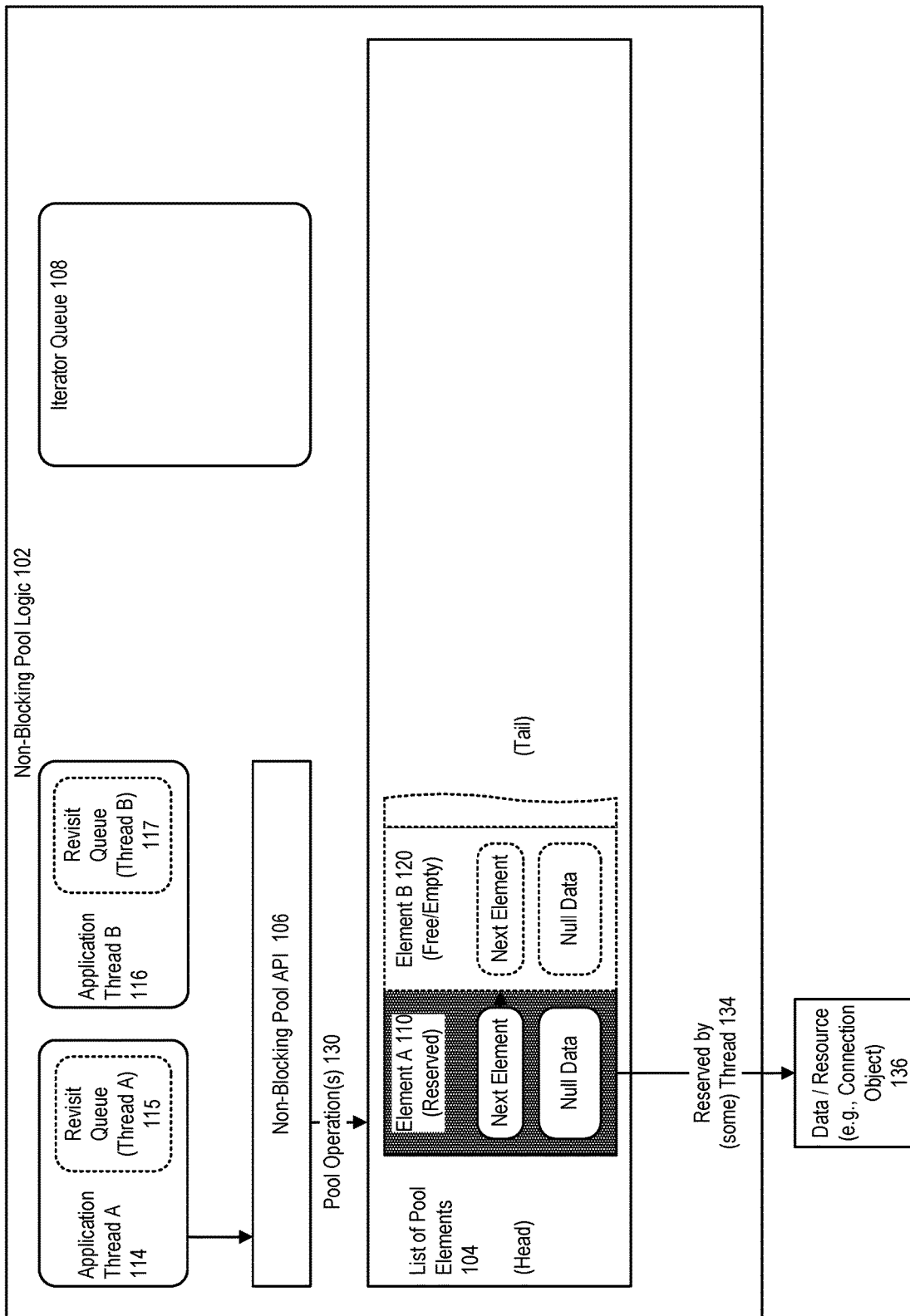
FIG. 5 further illustrates use of a non-blocking process, in accordance with an embodiment.

For example, as illustrated in FIG. 5, the pool element A can be reserved 134 by (some) thread, in order for that thread to examine whether the data or resource (e.g., connection object) 136 associated with that pool element, is potentially suitable for use by that thread, even though the underlying data or resource, in this example a connection, may ultimately not be checked-out by the thread.

Figure 6:
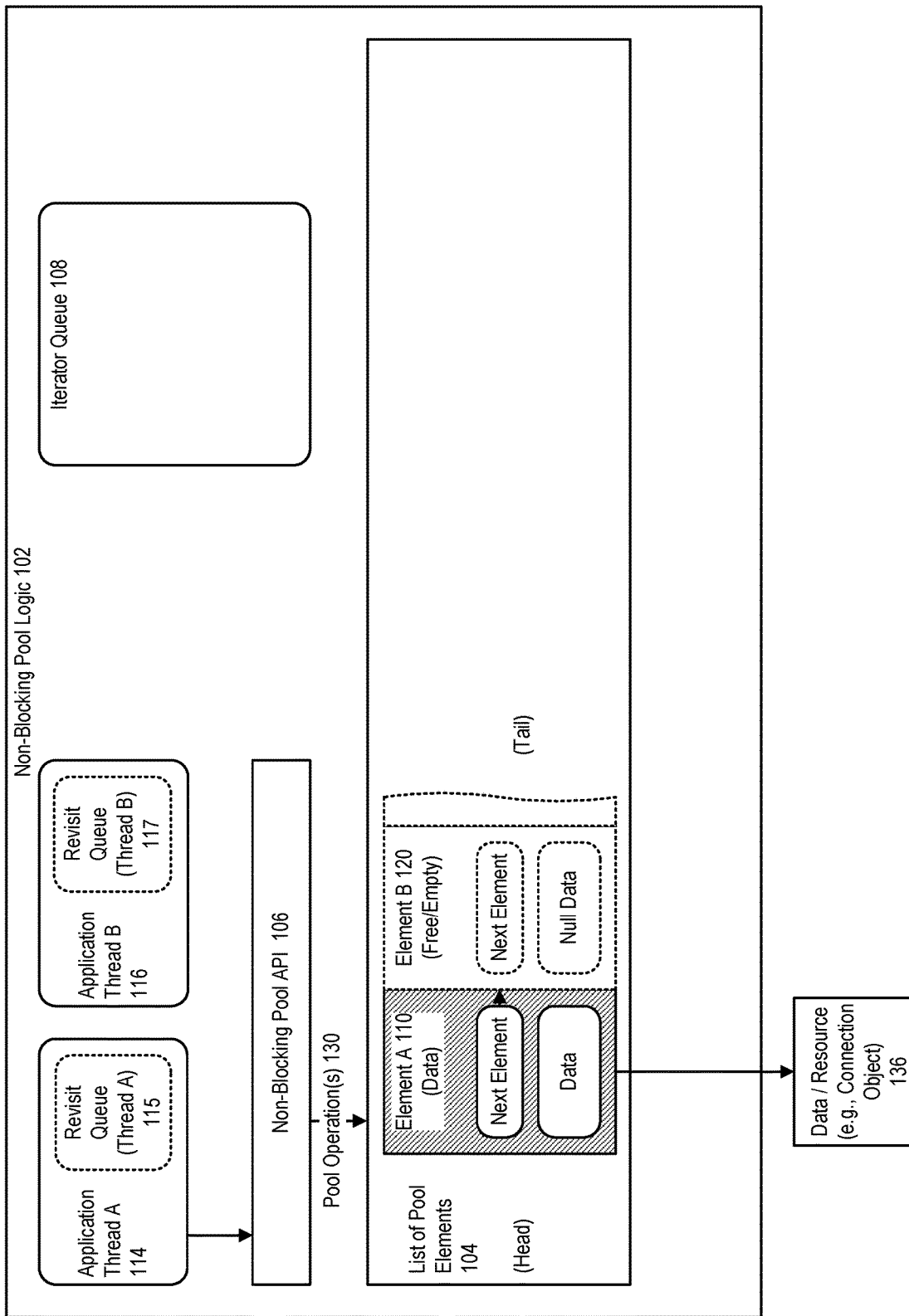
FIG. 6 further illustrates use of a non-blocking process, in accordance with an embodiment.

As illustrated in FIG. 6, if the pool element is suitable for further use by a reserving thread, then its data field can be updated accordingly, to reflect that it is being checked-out, borrowed, or otherwise being used by a particular thread, effectively removing that pool element from being made available within the resource pool.

In accordance with an embodiment, a thread reserves a pool element (e.g., one that may be associated with a particular connection) for a very short period of time, so it can check to see if it wants the data or resource associated with that pool element (e.g., the connection). In accordance with an embodiment, the action of reserving a pool element is an atomic operation and is very quick, which also allows a thread to quickly un-reserve it, and move on to consider a next pool element (e.g., a next connection), as necessary.

An advantage of this approach includes that, if a thread fails to reserve a pool element, the thread can simply note that it has not looked at that pool element, but can otherwise continue to perform useful work to determine if there is, perhaps, another pool element (e.g., connection) that may be suitable or satisfactory. Since there is no holding of threads, which continue to perform useful work, the described approach provides improved performance over the use of, for example, critical sections.

In accordance with an embodiment, a pool iteration operation is similar to that of insertion. To avoid having to parse through the whole resource pool, the fill reference can be optionally used as a clue to determine where to start parsing the list. Generally, the fill reference is used only for insertion once it points out for a vacant slot for insertion. In this sense, the fill reference operates as an optimization in providing a reference point to start an iteration with, but is not a required feature. For example, to perform a pool iteration, without using a fill reference, the system can simply start at the head (listhead) and parse through pool elements one by one, to the tail (listtail), ignoring empty slots. Other threads that cannot access a pool element at the same time can skip over that pool element, and make a note to revisit that pool element later if appropriate. When the system reaches the end of the list for a particular thread, it will have a list of any pool elements that particular thread had reserved, and potentially other pool elements which that particular thread had skipped since another thread had already reserved them.

In accordance with an embodiment, the above-described approach to iteration provides several benefits. For example, in some use cases, it may not be necessary for a thread to reserve a specific pool element, the thread may just be seeking something that is "good enough". In such use cases, a wait timeout can also be used to support e.g., those situations in which the system will give up waiting and return an error.

Additionally, the approach avoids the problem of thread starvation in situations having a lesser amount of resources. The iterator queue provides a way to access skipped pool elements in a fair way, since these pool elements are subject to being revisited, and many threads may want to revisit the same skipped pool element. Since thread scheduling is stochastic, and a thread might otherwise continually see these pool elements as reserved, that thread's progress could be retarded in some manner. In accordance with an embodiment, to avoid such thread starvation, the system forces threads to revisit in the order in which they first attempted to revisit the object, in a first-in-first-out manner.

Figure 7:
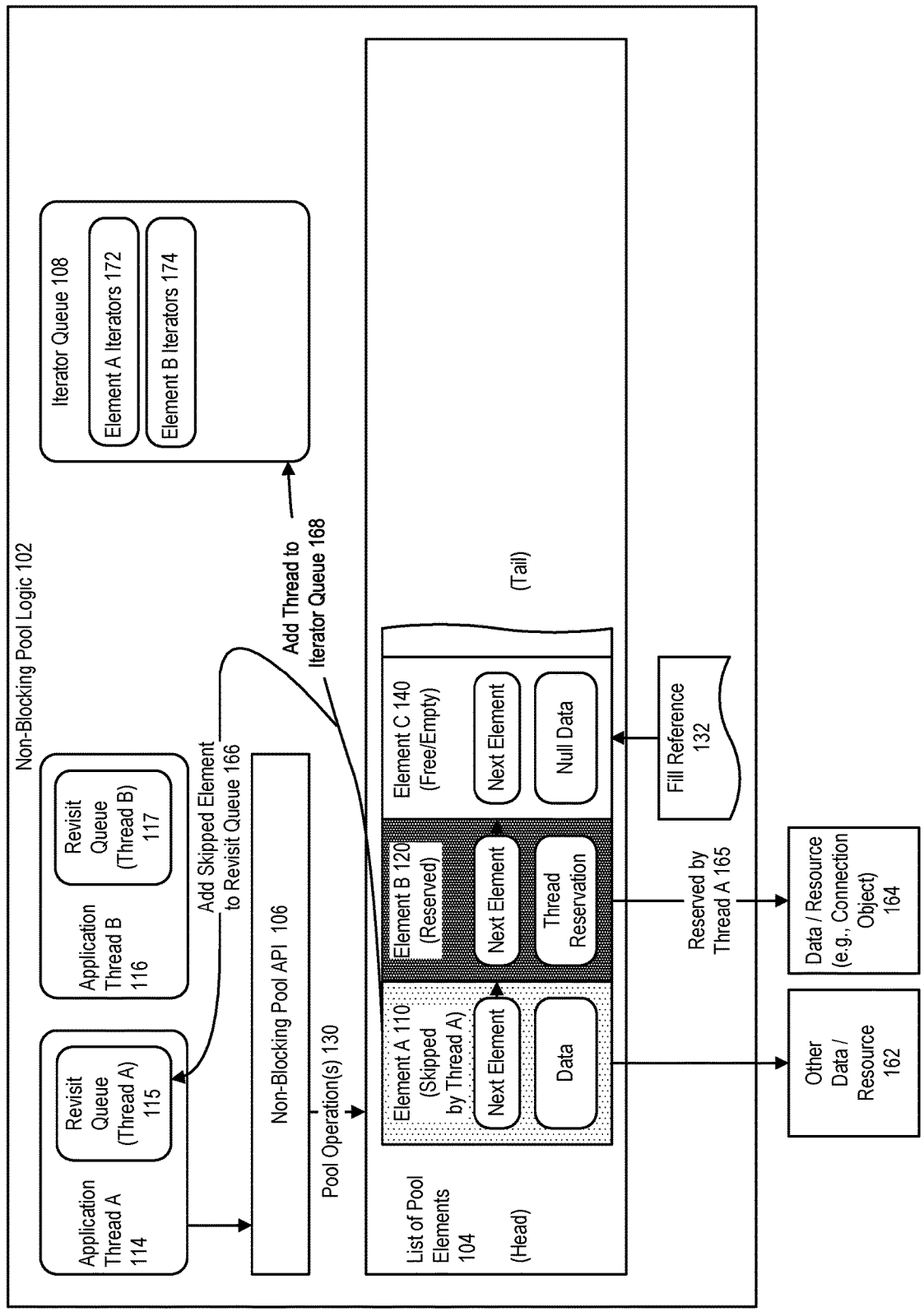
FIG. 7 further illustrates use of a non-blocking process, in accordance with an embodiment.

For example, as illustrated in FIG. 7, in accordance with an embodiment, the list of pool elements includes pool elements A and B as before, and now also includes pool element C 140, of which pool element A has already been reserved for use with a data or other resource 162.

As such, in this example, if an application thread A requires a pool element for use with a particular data or other resource (e.g., a connection object) 164, then pool element A is skipped, and the next pool element B is reserved 165, for use with that data or other resource. The skipped pool element is added to the revisit queue 166, for the requesting thread, and the thread is added 168 to the iterator queue, which in this example includes an indication of the iterators for pool element A 172, and those for pool element B 174. The fill reference, if used, is optionally updated to point to the next free pool element, in this example pool element C.

Figure 8:
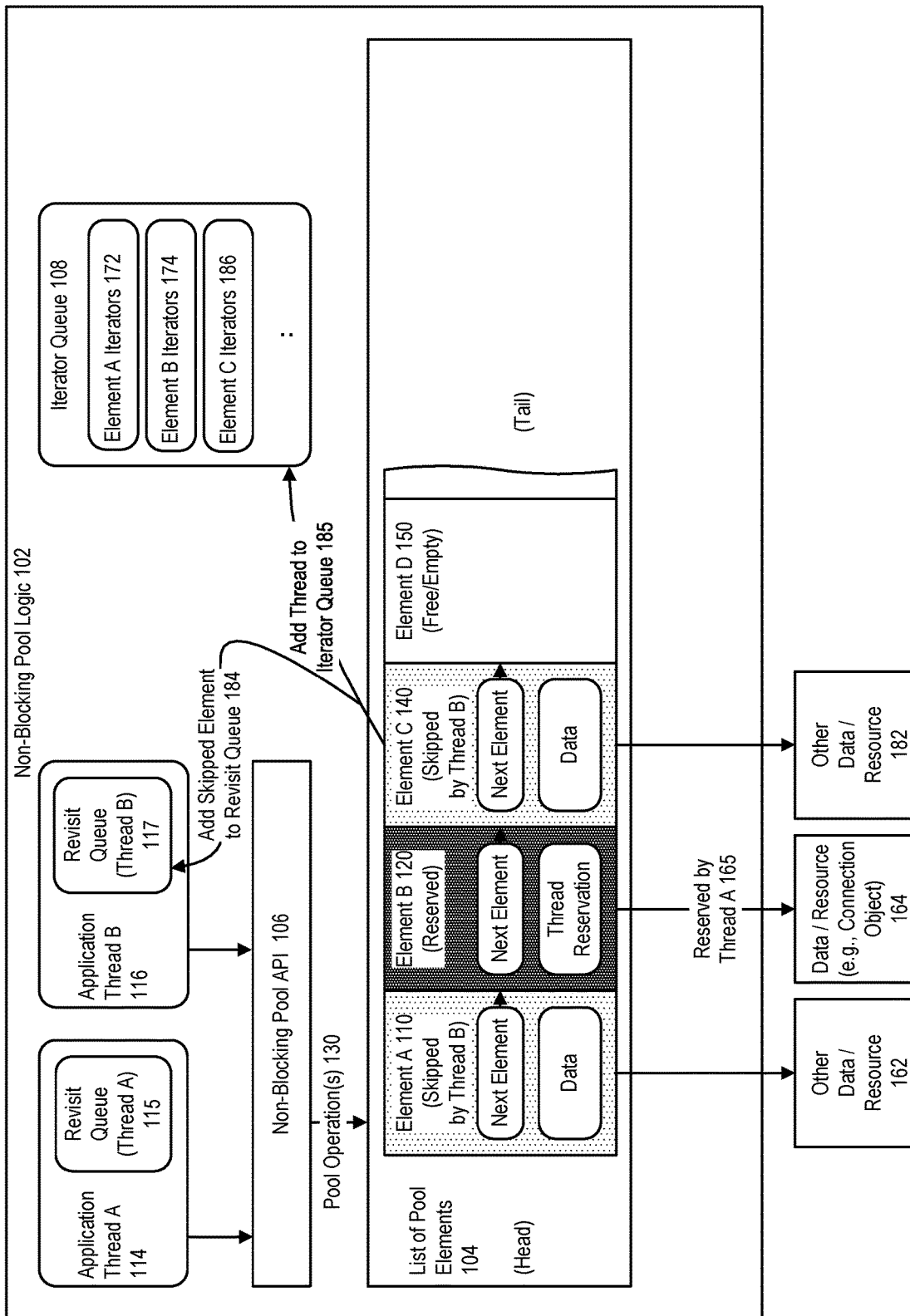
FIG. 8 further illustrates use of a non-blocking process, in accordance with an embodiment.

As illustrated in FIG. 8, which further illustrates the example described above, pool element C has now also been reserved for use with a resource 182. If an application thread B requires a pool element for use with a data or other resource, then pool element C is skipped, and another pool element D 150 is created, for use with that data or resource. The skipped pool element is similarly added to the revisit queue 184, for the requesting thread, and the thread is added 185 to the iterator queue, which in this example now includes an indication of the iterators for pool element C 186.

Figure 9:
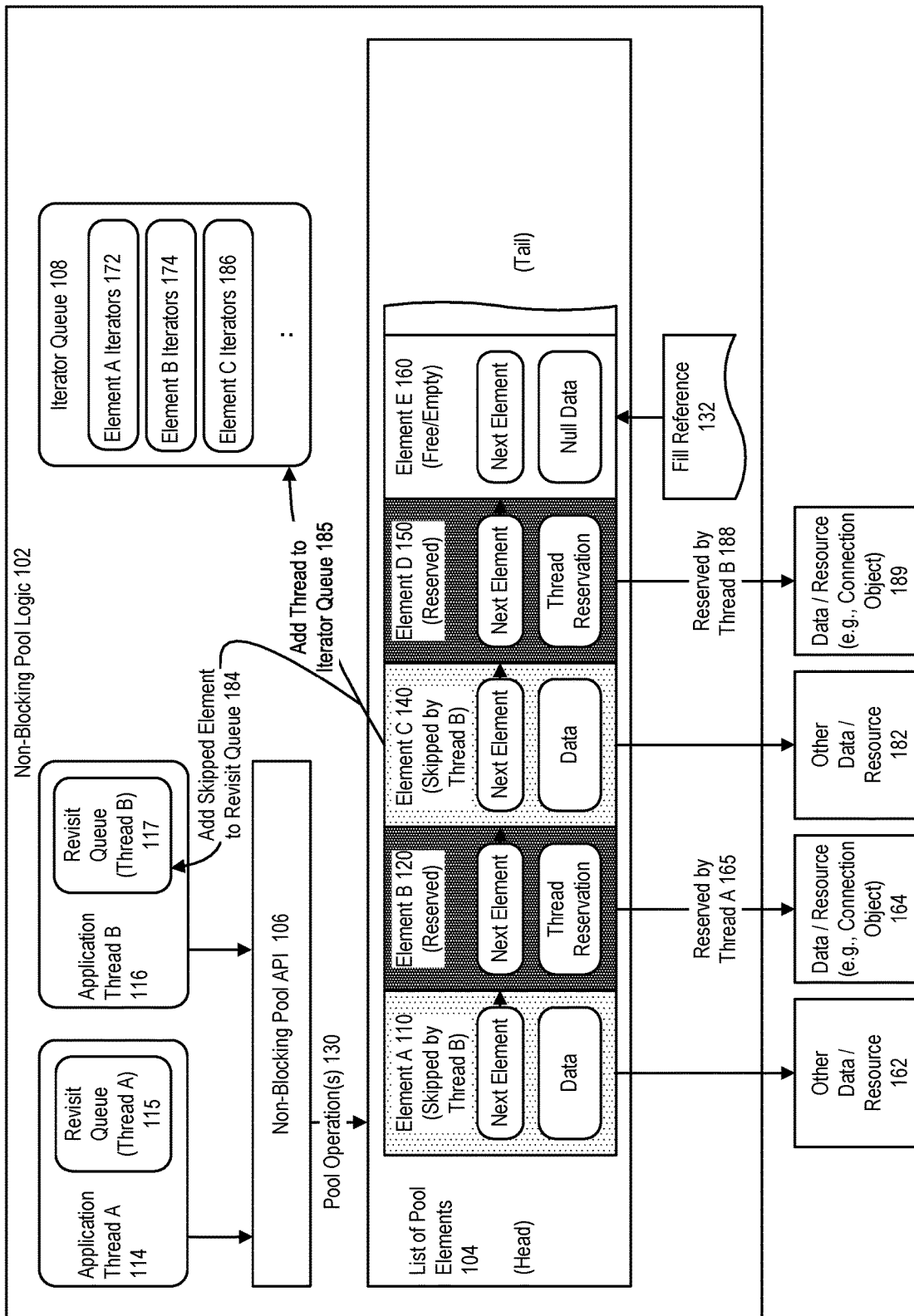
FIG. 9 further illustrates use of a non-blocking process, in accordance with an embodiment.

As illustrated in FIG. 9, the new pool element D can be reserved 188 for use with the data or other resource 189. The fill reference, if used, is again updated to point to the next free pool element, in this example pool element E 160.

Figure 10:
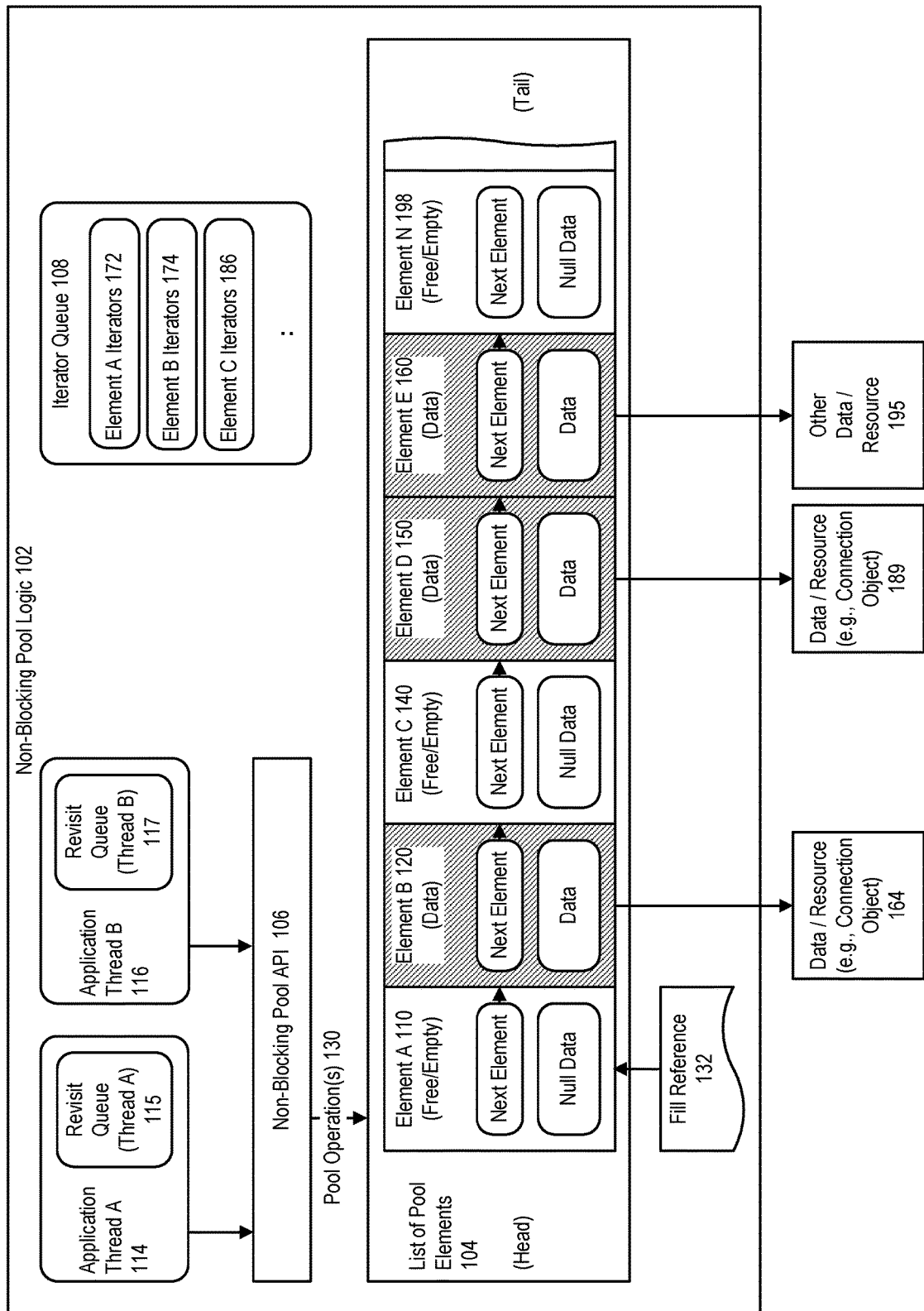
FIG. 10 further illustrates use of a non-blocking process, in accordance with an embodiment.

As illustrated in FIG. 10, which further illustrates the example described above, in accordance with an embodiment, as the list of pool elements becomes increasingly reserved, for use with additional data or other resources 195, then additional pool elements, such as pool element N 198 can be added, with the fill reference again optionally being updated, this time to the first free pool element in the list, which in this example is pool element A. In this example, each of elements B, D, and E, are currently associated with a data or other resource, for use by a thread, and are not currently available within the resource pool. Elements A, C, and N are neither associated with a data or other resource, nor are currently reserved by a thread; and are available for subsequent pool insertions.

The above approach works to cache pool elements that have special attributes, so can be useful in various use cases other than simply returning a first-available pool element.

For example, in a connection pool environment, a pool element can be associated with a connection label, and an application thread may want to find a particular pool element with a particular label—the pool elements themselves may all be different from one another. Additionally, as described above, in accordance with various embodiments, the system can support use cases in which a "good enough" match is desired, and not necessarily the only match, or the best match. Additionally, the system does not require a thread to wait for a best match if someone is using it, instead it can proceed to look for another or good enough match.

Exemplary Non-Blocking Process

In accordance with an embodiment, an exemplary process or algorithm is described hereunder, wherein the pool comprises a one-directional linked list of pool elements; and each pool element has its own iterator queue (another one-directional linked list containing references of threads that are going to revisit this pool element); and each participating thread has its own separate queue of pool elements to be revisited because they happened to be reserved during pool navigation by this thread.

List of Pool Elements

In accordance with an embodiment, a one-directional linked list of pool elements can be used. Each pool element has two atomic references: a reference for a next pool element (or null) and a reference to a thread that has reserved this pool element at this time (or null, if unreserved). The reference to an actual data (for example, a connection object or some other data or resource) is not atomic. As described above, optionally, a fill reference can be provided pointing to the first vacant pool element (data=null). Since the fill reference operates merely as an optimization hint, if it does not provide the correct reference, then this does not pose a problem, since in this case the wait-free pool (WFP) can simply add a new slot in the end of a pool's list, instead of using an empty slot in the middle of the list. The fill reference is used and updated by insertion and removal operations. Initially, the fill reference points to the pool's list head.

In accordance with an embodiment, a pool element reservation operation checks (with compareAndSet) for a reserved contents and, if it is null, writes a current thread reference in it.

Alternatively, a pool element release operation checks (with compareAndSet) for a current thread reference, and if found, assigns a null. If a wrong thread reference has been found, then a failure is raised, because a pool element has to be released by the same thread.

In accordance with an embodiment, the above pool element operations are not included in the pool API as themselves, but are instead included as part of the insertion and iteration operations.

Pool Element Insertion

In accordance with an embodiment, a pool element insertion operation does the following:

1. From the fillRef reference, a thread goes toward the list tail, trying to reserve each next pool element and if successful, checks for a data field. If the data is null, i.e., a pool element is empty, fills it up with new data and releases a pool element. The insertion is done.

2. While moving towards the list tail, a thread checks a next (with compareAndSet) and if it null, assigns a newly created pool element with data re-filled with the data to be inserted.

3. The fillRef reference gets updated accordingly.

Pool Iteration

In accordance with an embodiment, a pool iteration operation does the following:

1. First pass: from the list head, go towards the list tail. Per each iteration, an attempt to reserve a next pool element (if it exists, i.e., a thread did not reach the list tail) is performed. A thread can fail because this pool element is reserved by another thread, in which case this iterator enqueues a current pool element in its own revisit queue, and enqueues itself into a queue of this pool element's iterator queue. If reserved, a pool element becomes accessible to a calling application. During the next move through a list, the current pool element gets released, and the next one gets reserved.

2. Second and further passes: going through a revisit queue, an iterator tries all pool elements scheduled for a revisit, checking for two things: whether the current iterator is on the head of the queue of pool iterators, and if a reserve operation is succeeded. Upon success, a thread reserves a pool element and dequeues an iterator from an iterators queue. Upon a failure, this pool element stays in a revisit queue for the next revisit pass, and an iterator stays in the iterator queue for this pool element.

Pool Element Removal

In accordance with an embodiment, a pool element removal operation can be done only on a currently reserved operation. The element's data field is assigned to null. The fill reference gets updated accordingly.

Pool Iterators

In accordance with an embodiment, each pool iterator corresponds to a participating thread, plus some other useful information for iterating through a pool, for example, a revisit queue.

Iterator Queue

In accordance with an embodiment, this is a one-directional list queuing iterators to revisit a pool element in a proper order.

An enqueue operation uses the compareAndSet operation for finding a list tail, and insert a new pool element on this tail. An operation can look for an appropriate iterator at the list head to revisit a pool element.

A dequeue operation removes an unneeded pool element from the list head. The dequeue operation does not need a spinlock operation on a head, because dequeue is performed by wiping out iterators from pool elements and the pool elements themselves can be removed occasionally, without synchronization.

Revisit Queue

In accordance with an embodiment, this is the thread local data, containing pool element to be revisited.

Exemplary Process Flows

Figure 11:
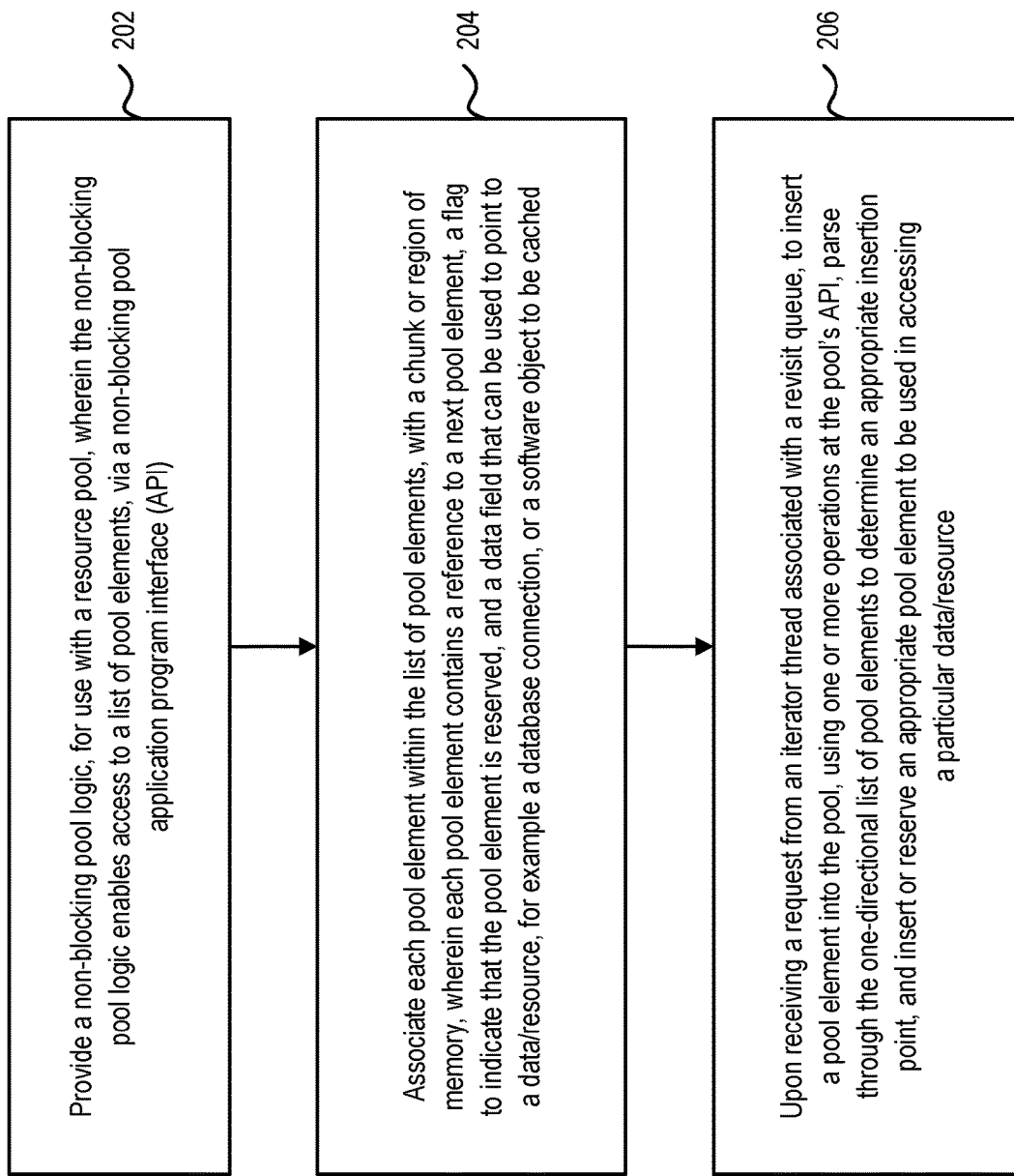
FIG. 11 illustrates a flowchart describing a non-blocking process, in accordance with an embodiment.

FIG. 11 illustrates a flowchart describing a non-blocking process, in accordance with an embodiment.

As illustrated in FIG. 11, in accordance with an embodiment, at step 202, a non-blocking pool logic is provided, for use with a resource pool, wherein the non-blocking pool logic enables access to a list of pool elements, via a non-blocking pool application program interface (API).

At step 204, each pool element within the list of pool elements is associated with a chunk or region of memory, wherein each pool element contains a reference to a next pool element, a flag to indicate that the pool element is reserved, and a data field that points to a data or other resource, such as, for example, a database connection or other software object to be cached.

At step 206, upon receiving a request from an iterator thread associated with a revisit queue, to insert a pool element into the pool, using one or more operations at the pool's API, the one-directional list of pool elements is parsed to determine an appropriate insertion point, and insert or reserve an appropriate pool element to be used in accessing a particular data or other resource.

Figure 12:
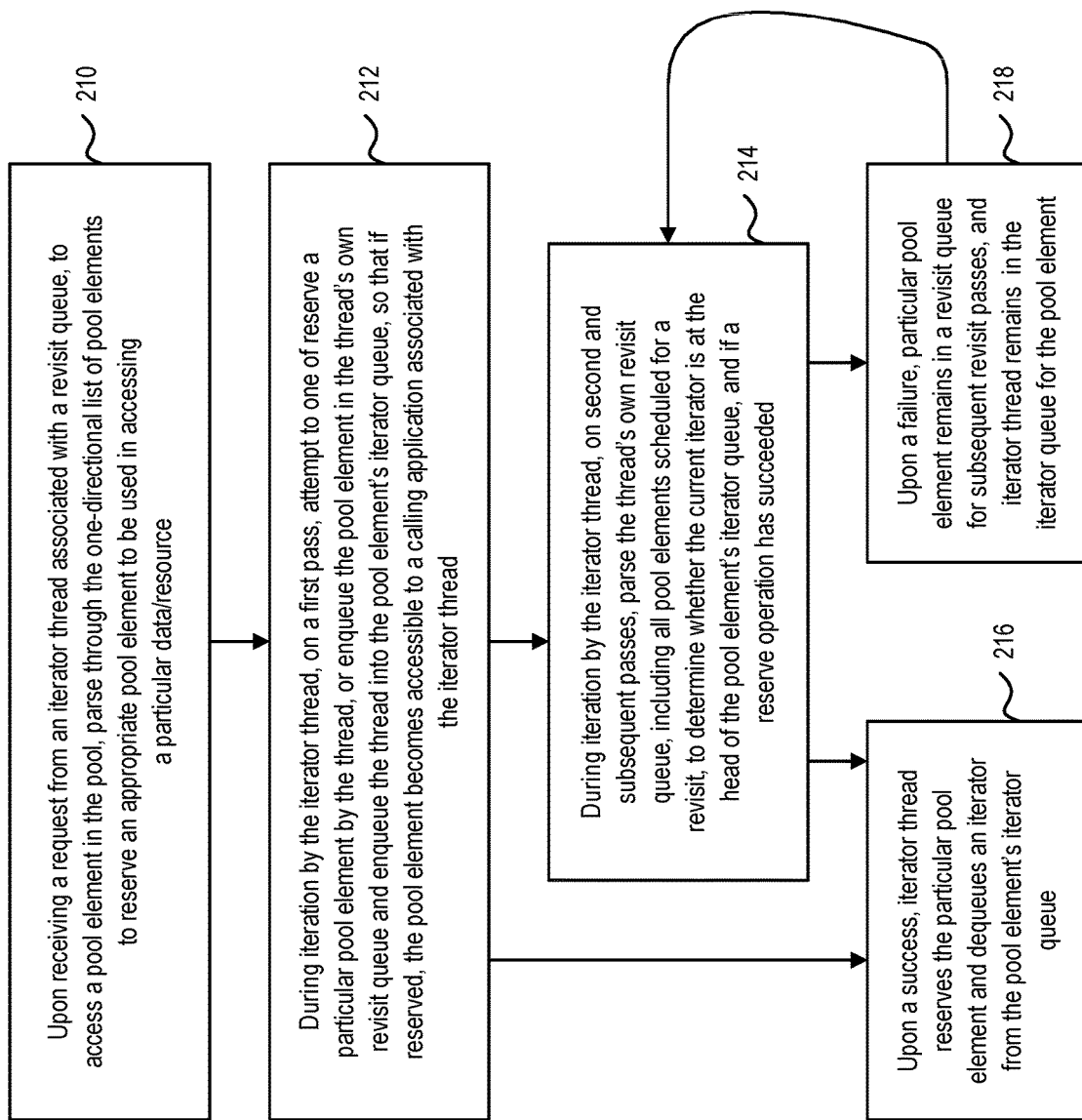
FIG. 12 further illustrates a flowchart describing a non-blocking process, in accordance with an embodiment.

FIG. 12 further illustrates a flowchart describing a non-blocking process, in accordance with an embodiment.

As illustrated in FIG. 12, in accordance with an embodiment, at step 210, upon receiving a request from an iterator thread associated with a revisit queue, to access a pool element in the pool, using one or more operations at the pool's API, the one-directional list of pool elements is parsed to reserve an appropriate pool element to be used in accessing a particular data or other resource.

At step 212, during iteration by the iterator thread, on a first pass, an attempt is made to one of reserve a particular pool element by the thread, or enqueue the pool element in the thread's own revisit queue and enqueue the thread into the pool element's iterator queue, so that if reserved, the pool element becomes accessible to a calling application associated with the iterator thread.

At step 214, during iteration by the iterator thread, on second and subsequent passes, the thread's own revisit queue is parsed, including all pool elements scheduled for a revisit, to determine whether the current iterator is at the head of the pool element's iterator queue, and if a reserve operation has succeeded.

At step 216, upon a success, the iterator thread reserves the particular pool element and dequeues an iterator from the pool element's iterator queue.

At step 218, upon a failure, the particular pool element remains in a revisit queue for subsequent revisit passes, and the iterator thread remains in the iterator queue for the pool element.

UCP Implementation

Figure 13:
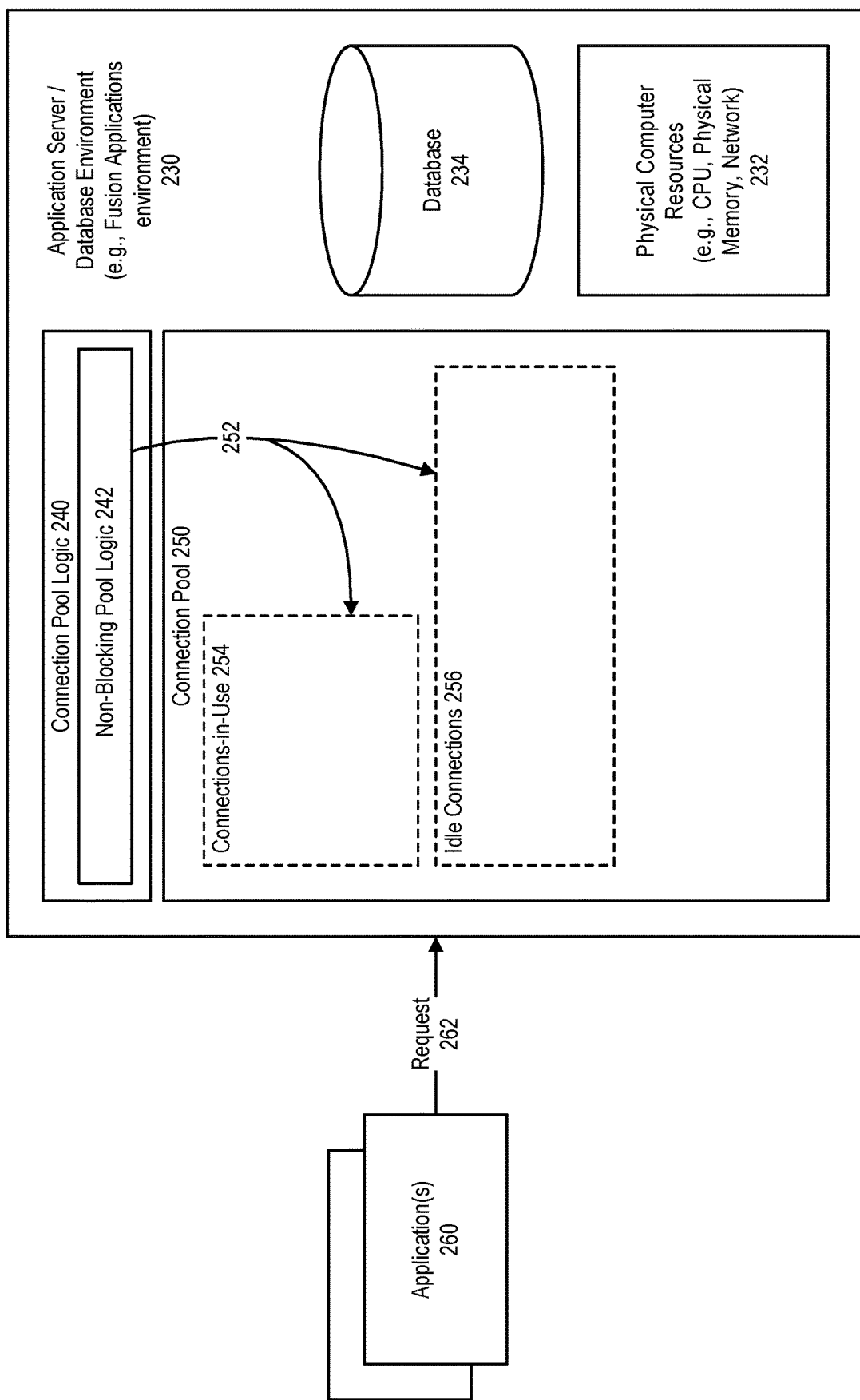
FIG. 13 illustrates an exemplary use of a non-blocking process with a connection pool environment, in accordance with an embodiment.

FIG. 13 illustrates an exemplary use of a non-blocking process with a connection pool environment, in accordance with an embodiment.

As illustrated in FIG. 13, in accordance with an embodiment, an application server/database environment 230, which includes physical computer resources 232 (e.g., processor/CPU, memory or network component), can include or provide access to a database 234. A connection pool logic 240, including a non-blocking pool logic 242, can control 252 the creation and allocation of objects within a connection pool 250, including connections that are currently in use 254, and connections that are idle 256. Labeling connections allows a software application 260 to attach name/value pairs to a connection. The calling application can then request 262 a connection with a desired label from the connection pool. By associating labels with connection states, an application can retrieve an already-initialized connection from the pool and avoid the time and cost of re-initialization.

Figure 14:
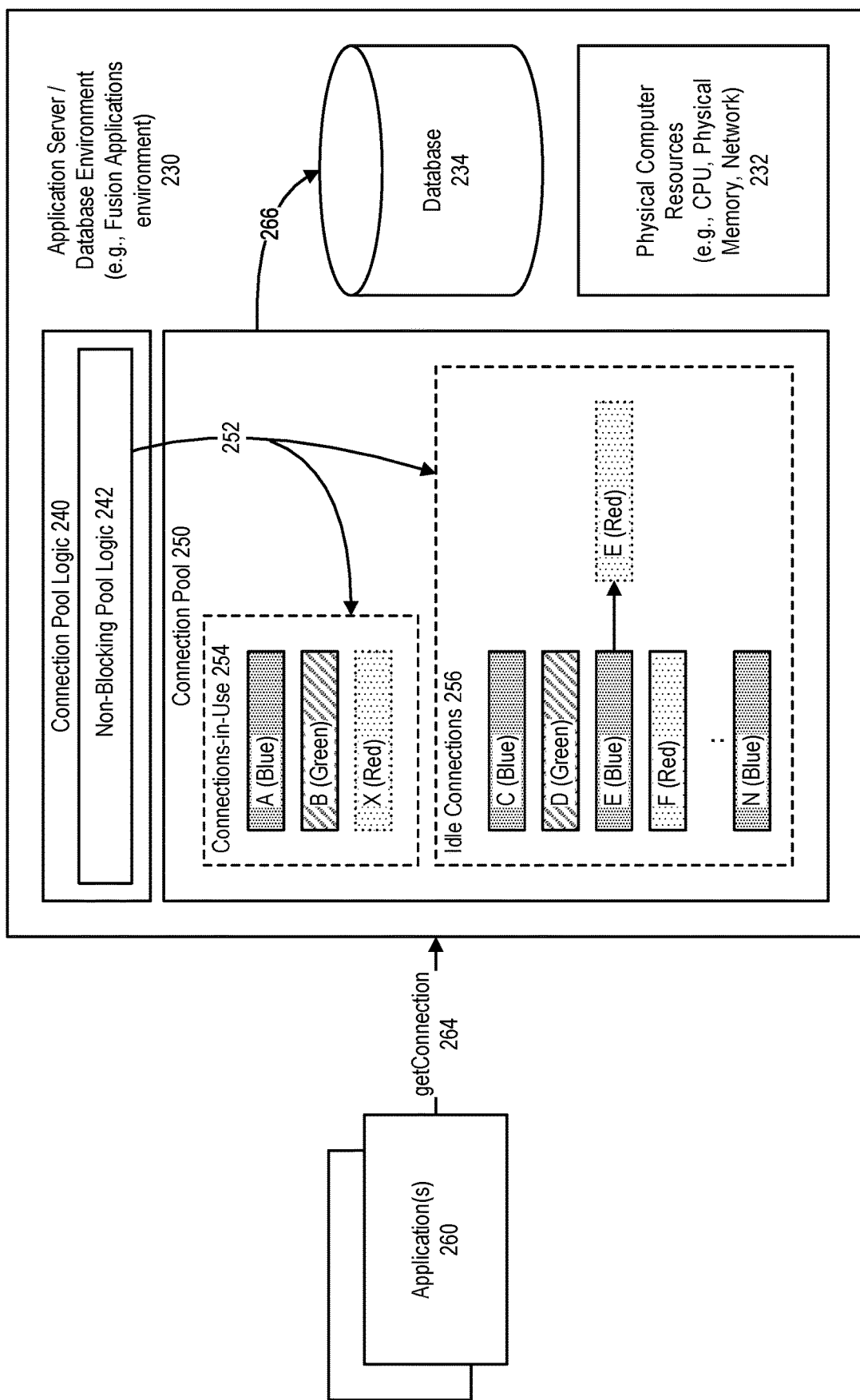
FIG. 14 further illustrates an exemplary use of a non-blocking process with a connection pool environment, in accordance with an embodiment.

FIG. 14 further illustrates an exemplary use of a non-blocking process with a connection pool environment, in accordance with an embodiment.

For example, the connection pool can include a plurality of connections, including connection A labeled (Blue) and connection B labeled (Green) that are currently in use, and connections C, D, E, F and N that are currently idle and which can be likewise labeled. If a software application wishes to make a request on the database, using a particular type of connection, it can make a getConnection request 264, say for a (Red) connection. In response, the connection pool logic can either provide an existing (Red) connection if one exists; create a new connection X (Red); or repurpose an existing connection, e.g., E (Red), to connect 266 to the database.

Figure 15:
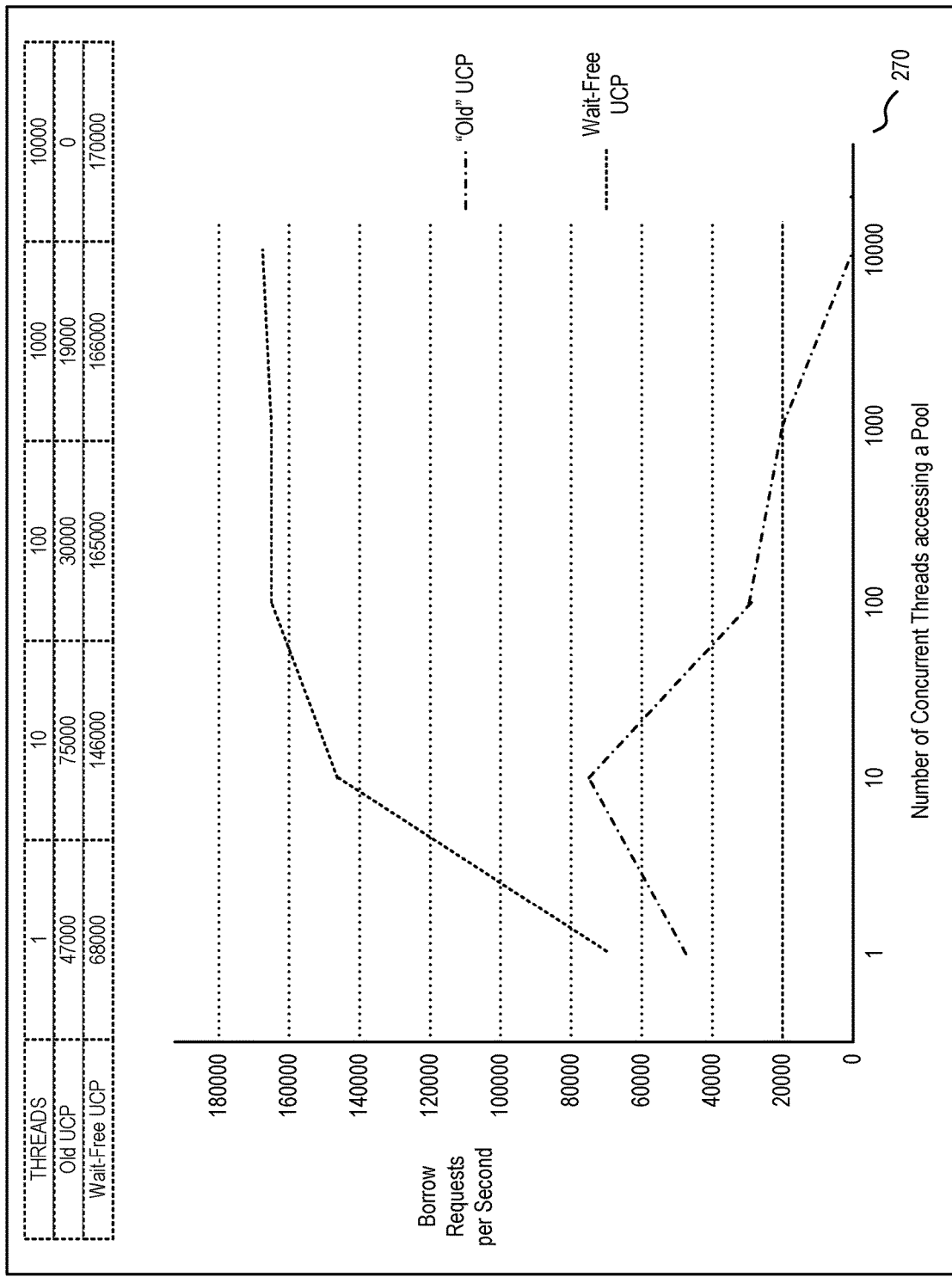
FIG. 15 illustrates the performance of an exemplary non-blocking process in a connection pool environment, in accordance with an embodiment.

FIG. 15 illustrates the performance of an exemplary non-blocking process in a connection pool environment, in accordance with an embodiment.

As illustrated in the example of FIG. 15, which illustrates a performance chart 270 that compares borrow/return request performance for a UCP environment which uses a non-blocking or wait-free process, versus an ("old" UCP) environment which does not use such a process, the amount of requests processed per second, as the number of concurrent threads accessing a pool increases, is improved when using a non-blocking process such as that described herein.

In the example illustrated in FIG. 15, the number of concurrent threads (shown on the X-axis) are competing for, in this instance, 6 physical connections, to borrow and immediately return back to the pool. The threads are not performing any further tasks on each connection, they simply borrow and return the connection. This example illustrates the speed of the borrow/return cycle, rather than the work performed by connections, as might be found in an environment in which a large amounts of threads are competing for a very limited amount of resources.

Figure 16:
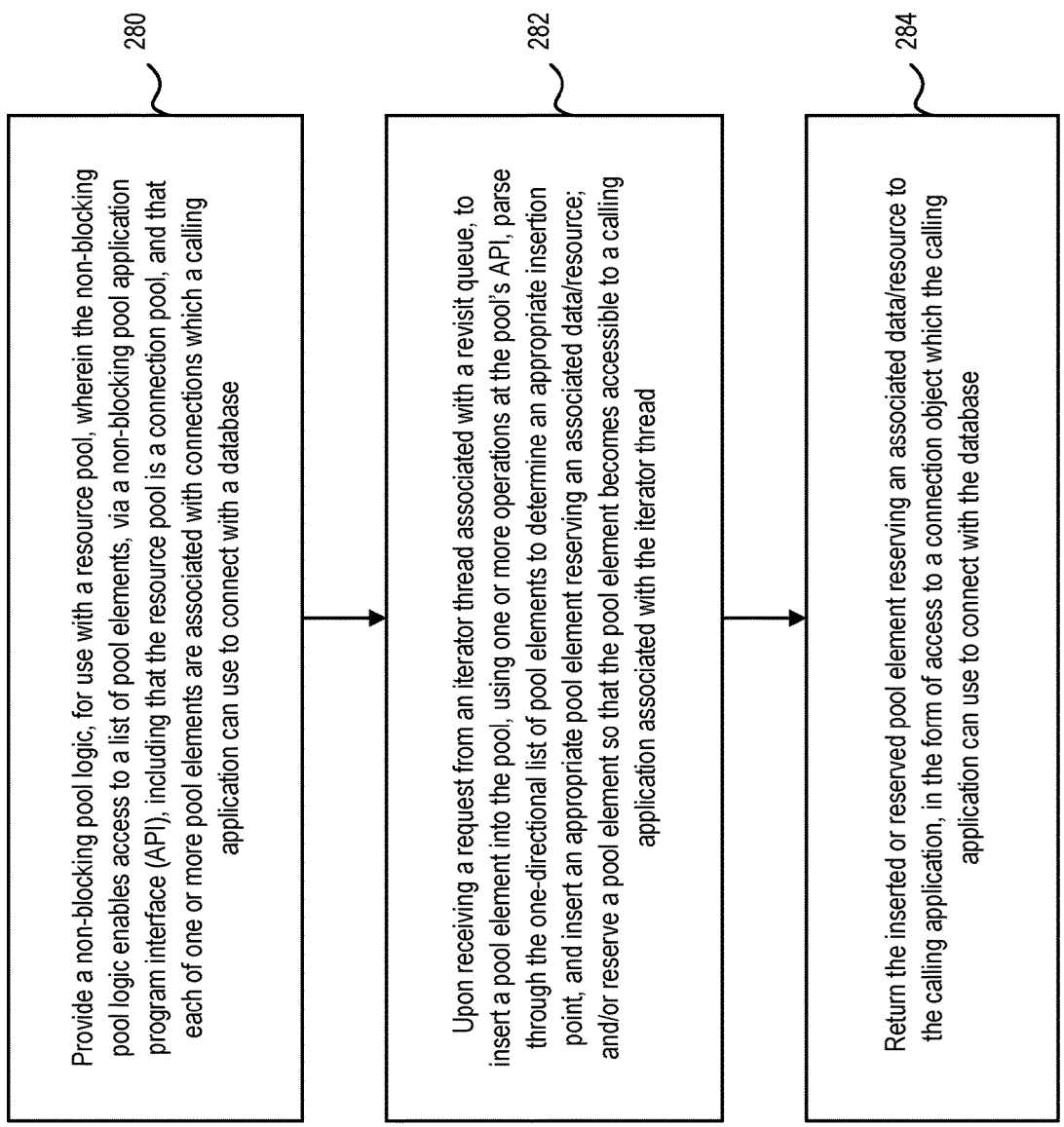
FIG. 16 illustrates an exemplary non-blocking process, for use in a connection pool environment, in accordance with an embodiment.

FIG. 16 illustrates an exemplary non-blocking process, for use in a connection pool environment, in accordance with an embodiment.

As illustrated in FIG. 16, in accordance with an embodiment, at step 280, a non-blocking pool logic is provided for use with a resource pool, wherein the non-blocking pool logic enables access to a list of pool elements, via a non-blocking pool application program interface (API), including that the resource pool is a connection pool, and that each of one or more pool elements are associated with connections which a calling application can use to connect with a database.

At step 282, upon receiving a request from an iterator thread associated with a revisit queue, to insert a pool element into the pool, using one or more operations at the pool's API, the system parses through the one-directional list of pool elements to determine an appropriate insertion point, and insert an appropriate pool element reserving an associated data or other resource; and/or reserve a pool element so that the pool element becomes accessible to a calling application associated with the iterator thread.

At step 284, the inserted or reserved pool element reserving an associated data or other resource is returned to the calling application, in the form of access to a connection object which the calling application can use to connect with the database.

Connection Borrow with Multidimensional Search

In accordance with an embodiment, the system enables multidimensional search within a resource pool, to support complex borrow operations such as, for example, specifying ranges for particular connection properties. As threads access the pool, attempting to borrow connections having particular connection properties, one or more skipped pool elements can be represented as skip lists within a k-dimensional tree (KD-tree) or other data structure that enables searching across multiple dimensions. In response to receiving a request to borrow a connection having particular connection properties, a multidimensional search can be performed within the KD-tree to determine the availability of a connection having the requested properties.

In some connection pool environments, a certain amount of connection borrow operations may involve trivial requests such as, for example, a request to return any available connection to a database. More complex borrow operations generally involve non-trivial requests such as, for example, a request to return a connection associated with a specific database instance; specific database account; specific connection labels, or some other property.

The extent to which an application will primarily handle trivial requests or non-trivial requests generally depends on the particular requirements of that application. For example, a website application may be designed to primarily handle trivial requests, whereas another type of application may be designed to primarily handle non-trivial requests.

Generally, trivial requests can be handled effectively with a linear search, since there is a likelihood that a suitable connection will show up in the head of the pool. However, a non-trivial request to borrow a connection having specific properties may require an exhaustive search that is not as effectively handled with a linear search.

To address this, in accordance with an embodiment, the system enables multidimensional search that allows ranges to be specified for particular resource, e.g., connection, properties. For example, a multidimensional search can be used to examine a plurality of connections associated with a database instance "inst1", having a value of 0 cost for a label "country=USA", and a value of any cost for any other label.

In accordance with an embodiment, since linear search may be an effective approach for trivial borrow operations, the system can use a combination of linear search and multidimensional search, with a linear wait-free pool operating as a substructure, and a multidimensional KD-tree operating as a superstructure, for use during the search.

Multidimensional Search with KD-Trees

In accordance with an embodiment, the system can employ a KD-tree or other data structure that is suitable for organizing data points within a multidimensional space and supporting multidimensional searches such as, for example, range searches or nearest neighbor searches.

Figure 17:
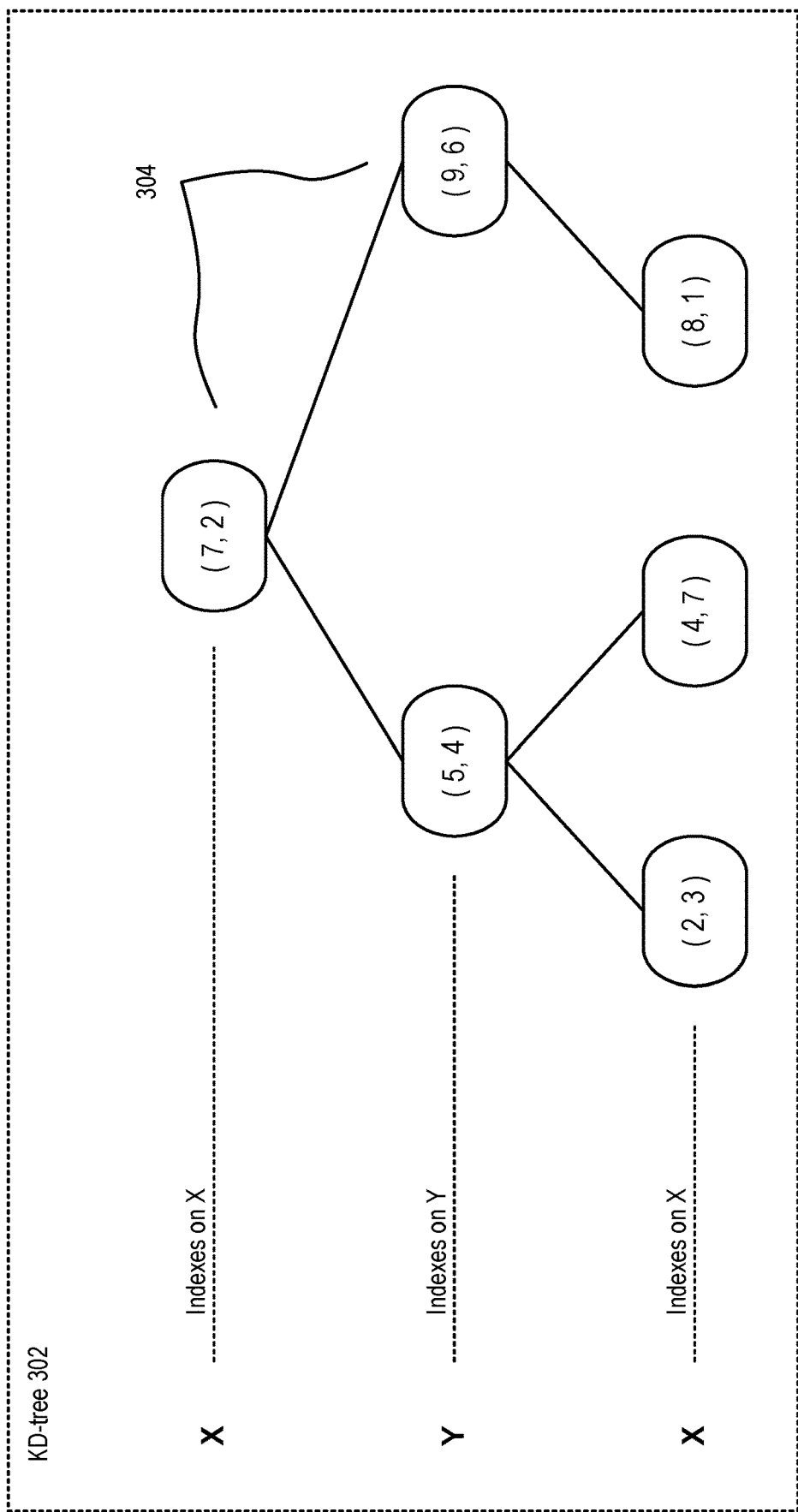
FIG. 17 illustrates an example of a k-dimensional tree (KD-tree), in accordance with an embodiment.

FIG. 17 illustrates an example of a KD-tree 302, in accordance with an embodiment, which enables searching within a plurality of dimensions (here indicated as X and Y dimensions). As illustrated in FIG. 17, the KD-tree includes a plurality of leaves 304 of data points, that can be indexed, keyed, or otherwise searched, in this example, by a first dimension X, and then by a second dimension Y, and then if appropriate by the first dimension X again, and so on, in response to a search request.

Figure 18:
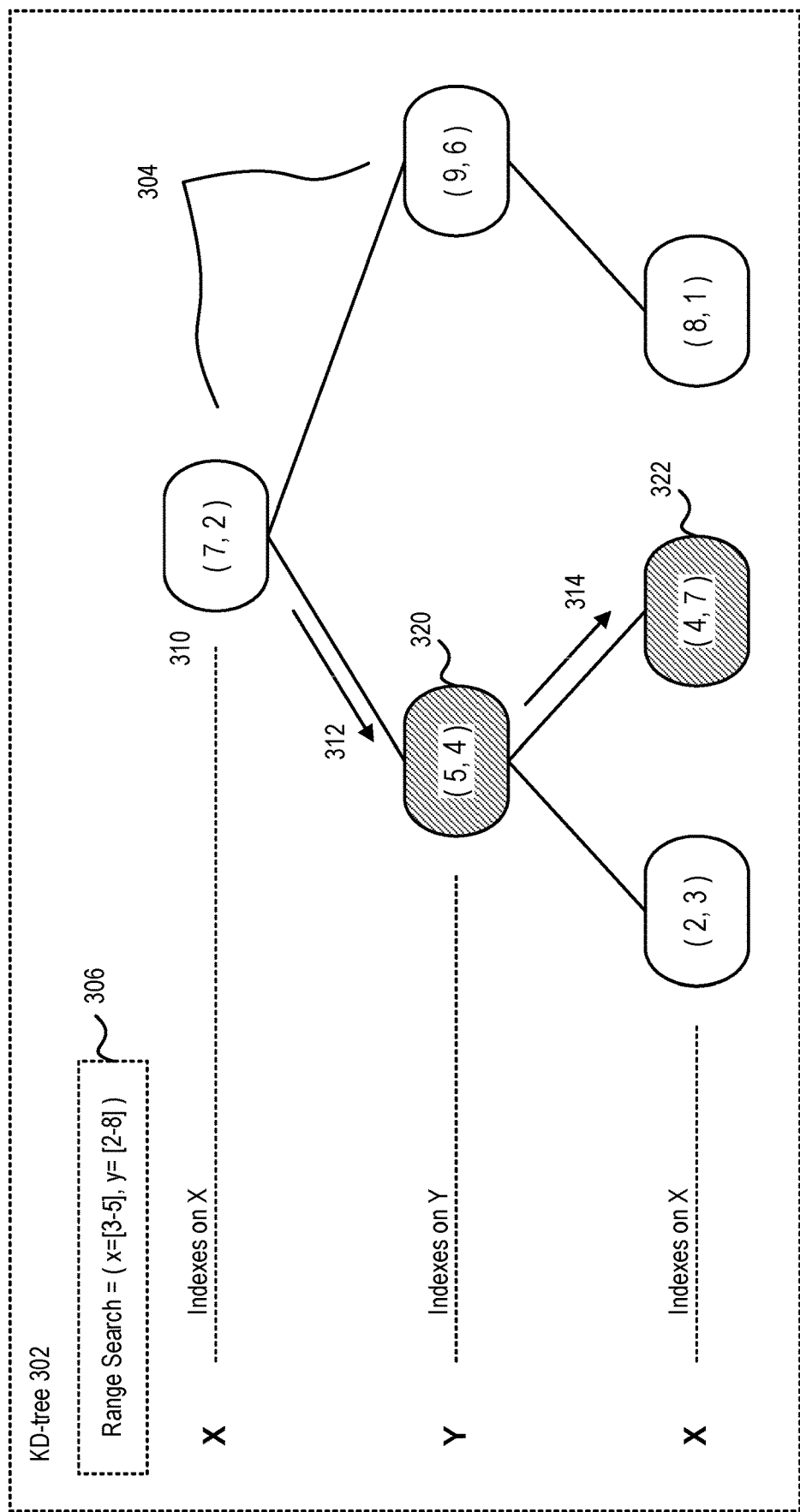
FIG. 18 illustrates an example of a search within a KD-tree, in accordance with an embodiment.

FIG. 18 illustrates an example of a search within a KD-tree, in accordance with an embodiment. As illustrated in FIG. 18, in response to receiving a search request 306 within a range of entries, in this example (x=[3-5], y=[2-8]), the system indexes, keys, or otherwise searches within the data points of the KD-tree, first 310 on the X dimension, then 312 on the Y dimension, and then if appropriate again 314 on the X dimension, to find one or more appropriate matches 320, 322.

Although the above example illustrates multidimensional search within a KD-tree having two dimensions, in accordance with an embodiment the technique can be similarly used to create and search within a KD-tree having many dimensions, with the understanding that the use of greater number of dimensions generally results in greater processing time.

Multidimensional Search within Connection Pools

In accordance with an embodiment, the technique for multidimensional search described above can be similarly used to create and search within a KD-tree for use with a connection pool. For example, a KD-tree can be created having three dimensions, representing, for example, (a) database instance, (b) label, and (c) connection cost. In such an embodiment, a search request can specify a range search within these dimensions, e.g., to obtain an appropriate connection within a particular range of connection types.

In accordance with an embodiment, each connection can be associated with a set of labels, and a cost in repurposing one label to another label. In such an example, a label can be used as one dimension for purposes of multidimensional search, with the cost (of repurposing the connection) as another dimension. For example, each subset of labels can be associated with a cost, wherein cost=100 generally means the connection is too costly to repurpose; cost=0 means there is no cost associated with repurposing the connection (i.e., the connection is an exact match); and cost=(0<N<100) means a partial match.

In accordance with an embodiment, clustered or other environments can support other types of dimensions such as, for example, instance, database, host, or service, that enable specification of properties for use in a clustered environment.

Skip Lists of Appropriate Connections

As described above, in accordance with an embodiment, as threads access the pool, attempting to borrow connections having particular connection properties, one or more skipped pool elements can be represented as skip lists within a k-dimensional tree (KD-tree) or other data structure that enables searching across multiple dimensions. Generally described, a skip list data structure (skip list) enables fast search within an ordered sequence of elements, using a linked hierarchy of subsequences, with each successive subsequence skipping over fewer elements than a previous subsequence. Searching starts with the sparsest subsequence, and then each, less sparse, subsequence, to find a suitable match.

In accordance with an embodiment, as connections are created, and threads search for particular connections, a KD-tree can be populated with skip lists that represent revisit queues. When searching for a connection with a specific properties, the system can retrieve an appropriate skip list from the KD-tree, and start visiting (only) the particular subset of slots in the wait-free pool indicated by the skip list.

In accordance with an embodiment, the above approach differs from a regular wait-free approach, in that the process starts visiting only the subset specified by the skip list from the KD-tree, rather than the whole set of wait-free pool elements (as might be the case of handling a trivial request for a connection). Connection borrow and return operations do not modify the wait-free pool, but instead mark appropriate connections as "available" or "borrowed". The operations that modify the wait-free pool are:

1. Addition of a new connection to the wait-free pool (usually as a result of a connection creation), which fills up an empty wait-free pool slot or extends a wait-free pool list to fill a new slot with a new connection;

2. Removal of a connection from the wait-free pool (usually as a result of a connection closure), which removes a connection to be closed leaving an empty slot;

3. Modification of connection properties (usually labels modification on a connection), in which an application can add or remove a label to/from an existing connection.

In accordance with an embodiment, the KD-tree can be wiped each time a new connection is added to, or removed from, the wait-free pool or "moves" within KD-tree space (i.e. modifies its vector, which generally happens only when a new label is assigned to, or removed from a connection; or with connection creation/closure during high availability and load balancing operations.

In accordance with an embodiment, if the KD-tree is empty or lacks an appropriate leaf, then the connection pool can perform a linear search through the wait-free pool, building a KD-subtree that corresponds to this connection request type, and saving an appropriate skip list for further usage. If a same type of search is received at a later time, then the pool can examine the KD-tree, find an appropriate skip list, and look for connections selectively (rather than exhaustively). Subtrees that are not applicable to a particular search can be excluded from the search.

Table 1 illustrates an example of a search multidimensional vector for use with a connection pool, in accordance with a RAC embodiment. The example illustrated in Table 1 is provided merely by way of example; in accordance with other embodiments, other types of vectors can be used, to support other use cases.

TABLE 1

| Metric | Mnemonics | Type | Description |
| --- | --- | --- | --- |
| Database account | Db_acct | String | A database account's name and password |
| RAC's instance | rac_inst | String | Instance of a RAC where a connection is established to |
| RAC's host | rac_host | String | Host of a RAC |
| RAC's service | rac_service | String | Service of a RAC |
| RAC's database | rac_db | String | Database on a RAC |
| Label | Label | String | Connection label for labeling mechanism |
| Cost | Cost | Integer | Connection label cost for labeling mechanism |

Example Usage

Figure 19:
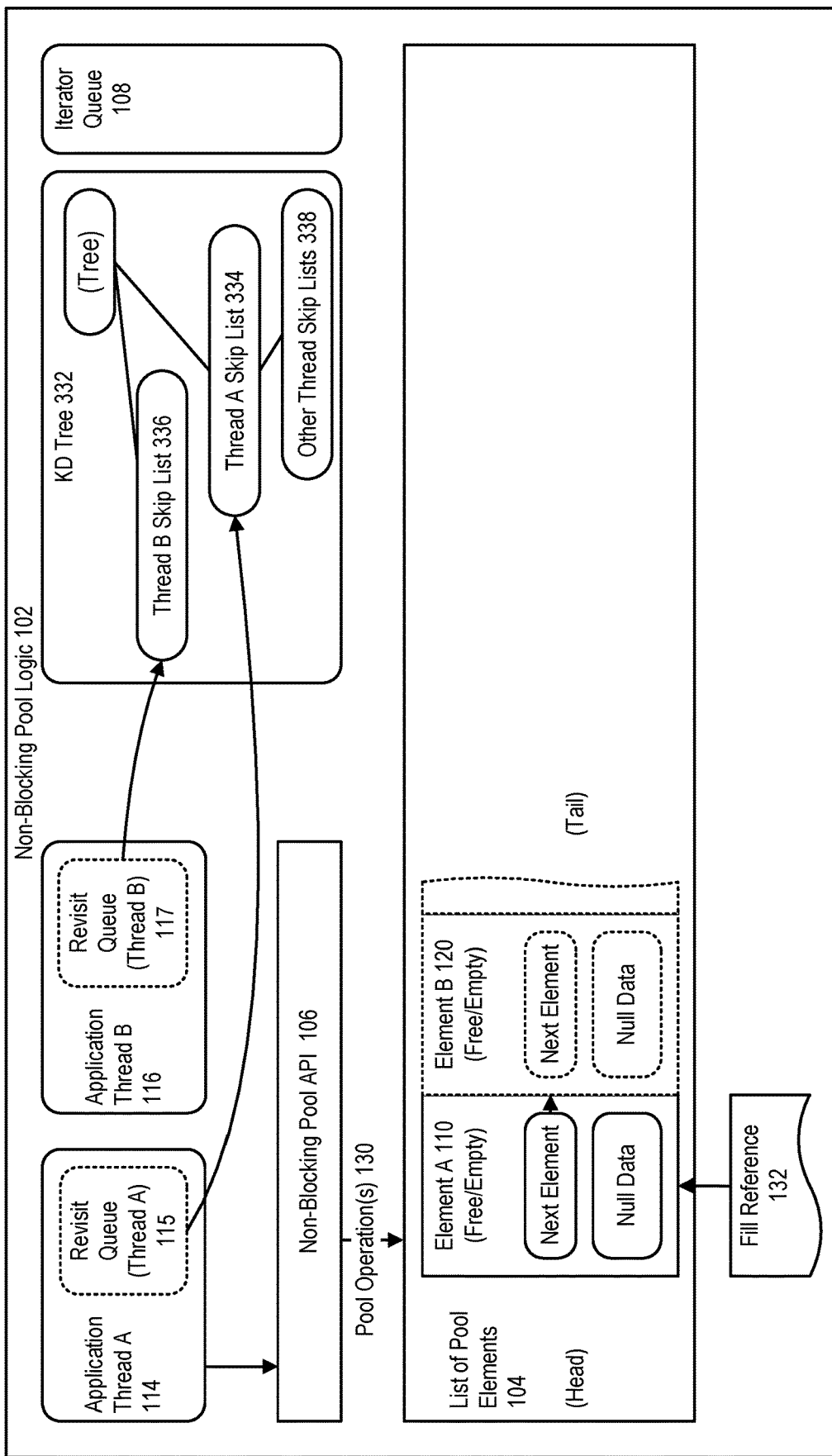
FIG. 19 illustrates an example usage of KD-tree with a non-blocking process, in accordance with an embodiment.

FIG. 19 illustrates an example usage of KD-tree with a non-blocking process, in accordance with an embodiment. As illustrated in FIG. 19, as connections are created, and threads search for particular connections, a KD-tree 332 can be populated with skip lists 334, 336, 338 that represent revisit queues, which can be subsequently searched using multidimensional search, as described above.

Figure 20:
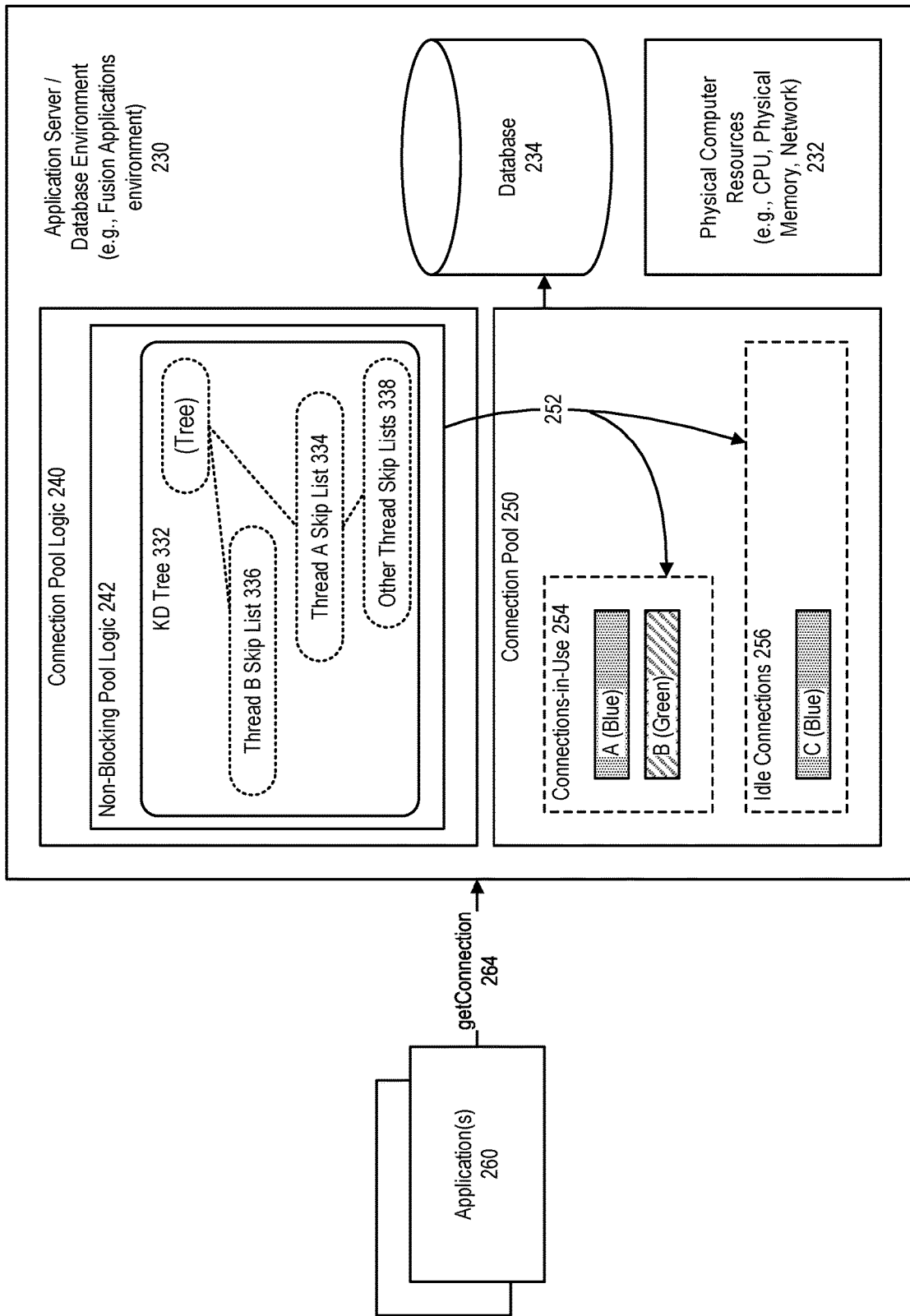
FIG. 20 further illustrates an example usage of KD-tree with a non-blocking process, in accordance with an embodiment.

FIG. 20 further illustrates an example usage of KD-tree with a non-blocking process, in accordance with an embodiment. As illustrated in FIG. 20, when searching for a connection with a specific properties, the connection pool logic can start visiting (only) the particular subset of slots in the wait-free pool indicated by an appropriate skip list. The connection pool logic can then, depending on the particular use case or implementation, either provide an existing connection if one exists; create a new connection; or repurpose an existing connection, to connect to the database.

Example Search

Figure 21:
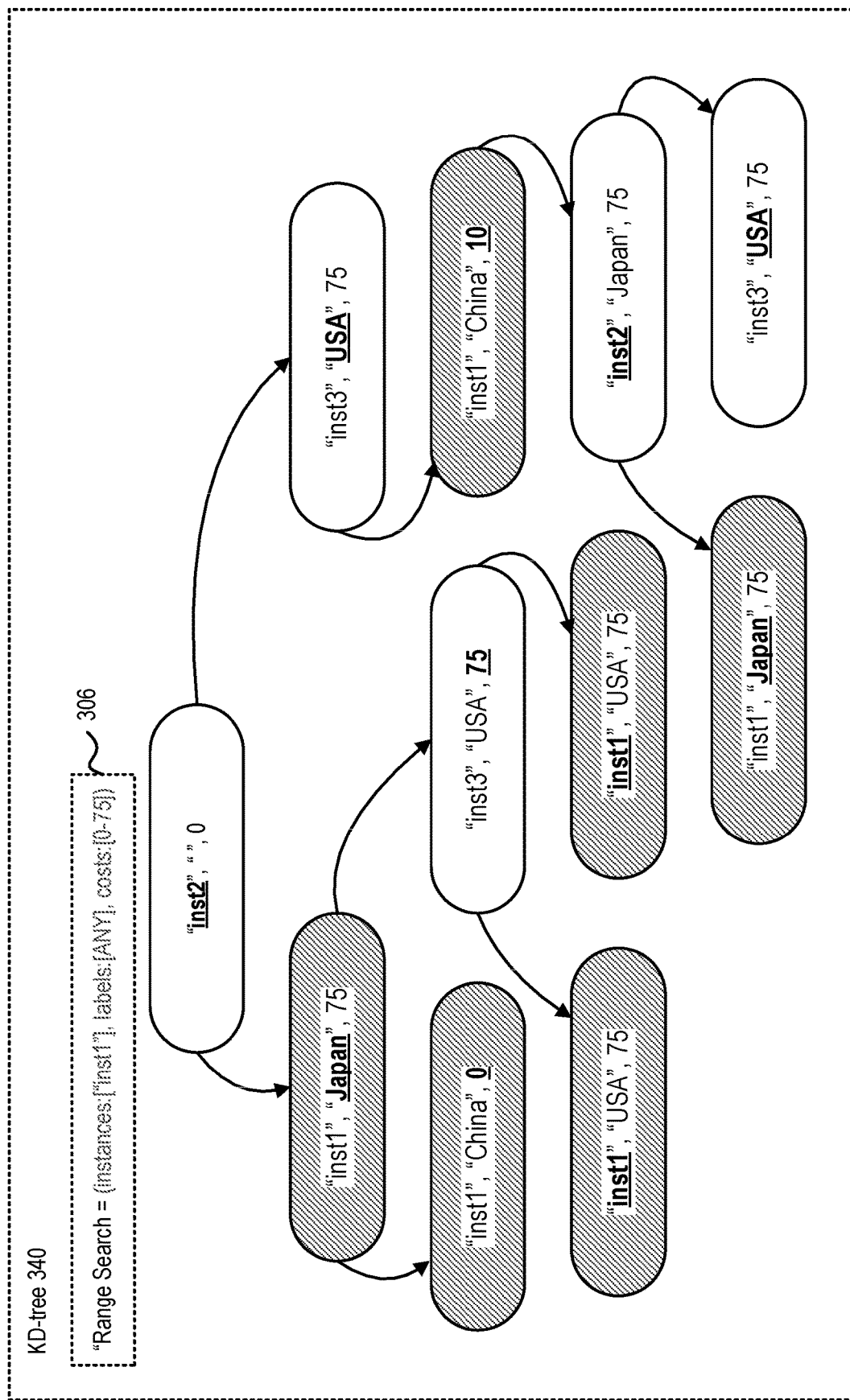
FIG. 21 illustrates an example search using a KD-tree, in accordance with an embodiment.

FIG. 21 illustrates an example search using a KD-tree, in accordance with an embodiment. As illustrated in FIG. 21, the example KD-tree shown therein includes a plurality of leaves that can be indexed, keyed, or otherwise searched, in this example, by a first dimension "Instance", second dimension "Label", and third dimension "Cost", forming a 3-dimensional vector. An empty label at the root of the tree means "any connection" (i.e., this leaf contains a skip list of all connections for a given instance). Each of the KD-tree leaves contain a leaf descriptor or vector for all three dimensions, and an appropriate skip list, containing information for a selective search. The skip list's elements are the connections with appropriate properties.

As illustrated in FIG. 21, in response to receiving a search request 306 within a range of entries, in this example (instances:["inst1"], labels:[ANY], costs:[0-75]), the system can index, key, or otherwise search within the KD-tree, using multidimensional search, as described above, to find one or more appropriate matches (indicated as shaded in the figure)

KD-Tree Search Process

Figure 22:
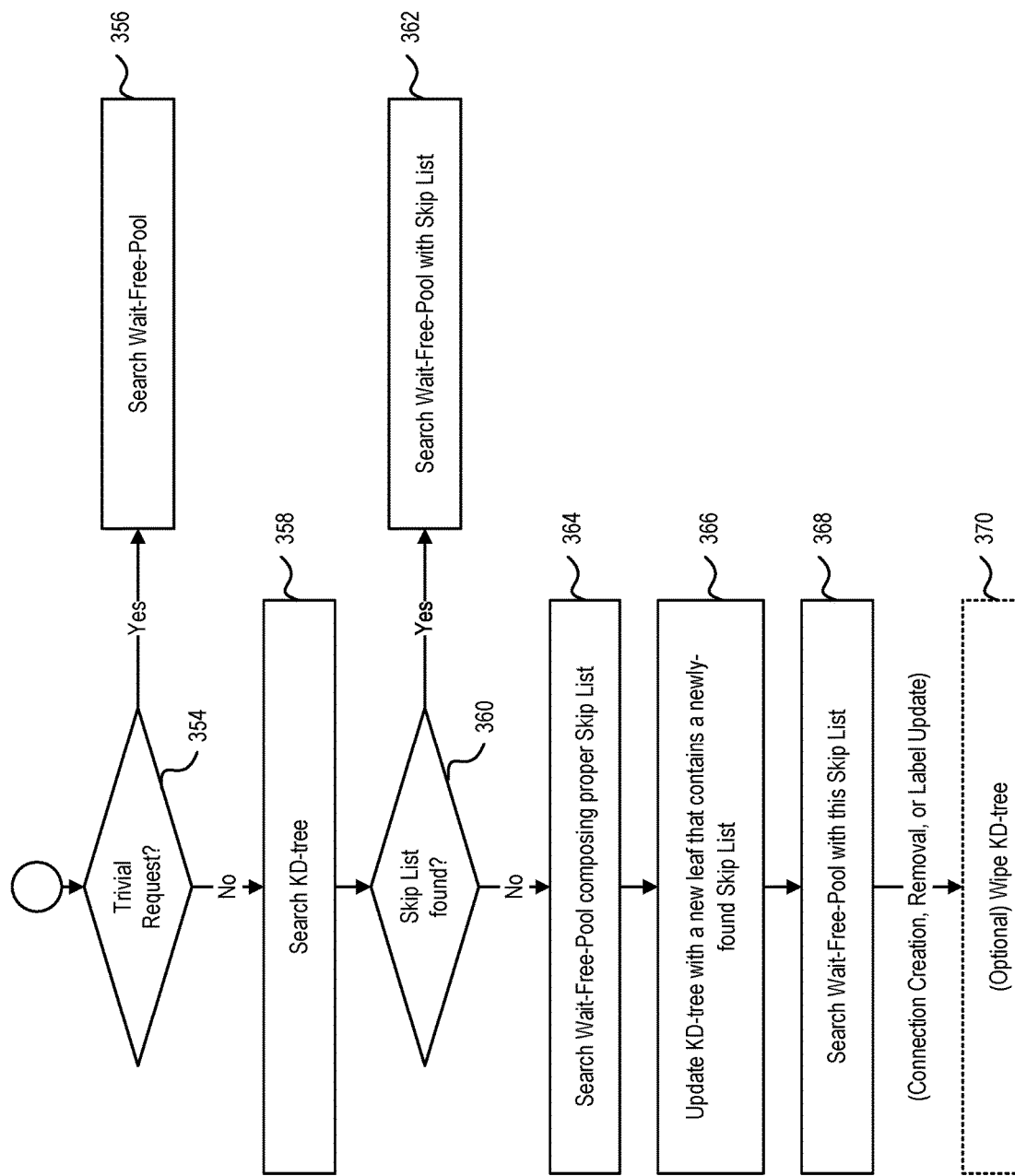
FIG. 22 illustrates a process for use of a KD-tree with a non-blocking process, in accordance with an embodiment.

FIG. 22 illustrates a process for use of a KD-tree with a non-blocking process, in accordance with an embodiment.

As illustrated in FIG. 22, in accordance with an embodiment, during a connection search, if, at block 354, the request is a trivial request, then, at block 356, the wait-free pool is searched.

Otherwise, at block 358, the KD-tree is searched.

If, at block 360, a skip list is found, then, at block 362, the wait-tree pool is searched with the found skip list.

Otherwise, at block 364, the wait-tree free pool is searched, composing a proper skip list.

At block 366, the KD-tree is updated with a new leaf that contains a newly found skip list, and, at block 368, the wait-free pool searched with this skip list.

At block 370, upon a connection creation, removal or labels update, the KD-tree is wiped.

In accordance with an embodiment, not all borrow requests require use of a KD-tree. For example, as described above, in some connection pool environments, an amount of connection borrow operations may involve trivial requests, such as, for example, a request to return any available connection to a database. In such environments, a regular wait-free pool approach can be used for trivial requests, without referring to a KD-tree; while retaining use of the KD-tree approach for more complex connection borrow operations or non-trivial requests, e.g., a request to connect to a database instance having a specific label.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. For example, while several of the examples described above illustrate the use of a non-blocking process in a connection pool environment, in accordance with various embodiments, the approach described herein can also be used with other types of computing environment.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system for use of a non-blocking process in a computing environment, comprising:
    one or more computers, including a processor that provides access by execution processes to a resource pool associated with a plurality of pool elements, wherein each pool element identifies a resource having multiple properties associated therewith that can be used by an execution process;
    wherein the execution processes selectively reserve pool elements associated with particular resources, for durations of reservation periods;

wherein during a reservation period by a particular execution process, others of the execution processes navigate through a remainder of the pool elements, reserving others of the plurality of pool elements and their associated resources for use by those execution processes;

wherein a data structure stores, within a tree, lists of skipped pool elements and associated property dimensions, while the execution processes navigate through and selectively reserve the pool elements and their associated resources;

wherein in response to receiving a request to reserve a particular resource with requested properties, the tree including the lists of skipped pool elements are searched across the property dimensions indicated by the request, to determine a subset of the pool elements and resources in the resource pool that matches the requested properties.

2. The system of claim 1, wherein the request to reserve a particular resource specifies a range of properties associated with the particular resource to be reserved, wherein the system determines a best or partially-matching set of pool elements to return in response to the request, based on a matching of the dimension properties associated with the pool elements.

3. The system of claim 1, wherein as the execution processes access the resource pool, to selectively reserve pool elements associated with particular resources, the system stores skipped pool elements as revisit queues within the data structure.

4. The system of claim 1, wherein the resource pool is a connection pool, wherein the system operates to provide access by the execution processes to a plurality of cached connections to a database, wherein each pool element identifies a particular connection having multiple properties associated therewith.

5. The system of claim 1, wherein the resource pool is a linear wait-free pool including the plurality of pool elements.

6. A method for performing multidimensional searching within a pool of resources in a computing environment, comprising:
providing, at one or more computers, access by execution processes to a resource pool associated with a plurality of pool elements, wherein each pool element identifies a resource having multiple properties associated therewith that can be used by an execution process;
wherein the execution processes selectively reserve pool elements associated with particular resources, for durations of reservation periods; and
wherein during a reservation period by a particular execution process, others of the execution processes navigate through a remainder of the pool elements, reserving others of the plurality of pool elements and their associated resources for use by those execution processes;
storing, within a data structure tree, lists of skipped pool elements and associated property dimensions, while the execution processes navigate through and selectively reserve the pool elements and their associated resources; and
in response to receiving a request to reserve a particular resource with requested properties, searching the tree including the lists of skipped pool elements across the property dimensions indicated by the request, to determine a subset of the pool elements and resources in the resource pool that matches the requested properties.

7. The method of claim 6, wherein the request to reserve a particular resource specifies a range of properties associated with the particular resource to be reserved, wherein the system determines a best or partially-matching set of pool elements to return in response to the request, based on a matching of the dimension properties associated with the pool elements.

8. The method of claim 6, wherein as the execution processes access the resource pool, to selectively reserve pool elements associated with particular resources, the system stores skipped pool elements as revisit queues within the data structure.

9. The method of claim 6, wherein the resource pool is a connection pool, wherein the system operates to provide access by the execution processes to a plurality of cached connections to a database, wherein each pool element identifies a particular connection having multiple properties associated therewith.

10. The method of claim 6, wherein the resource pool is a linear wait-free pool including the plurality of pool elements.

11. A non-transitory computer readable storage medium, including instructions stored thereon which when read and executed by one or more computers cause the one or more computers to perform a method comprising:
providing, at one or more computers, access by execution processes to a resource pool associated with a plurality of pool elements, wherein each pool element identifies a resource having multiple properties associated therewith that can be used by an execution process;
wherein the execution processes selectively reserve pool elements associated with particular resources, for durations of reservation periods; and
wherein during a reservation period by a particular execution process, others of the execution processes navigate through a remainder of the pool elements, reserving others of the plurality of pool elements and their associated resources for use by those execution processes;
storing, within a data structure tree, lists of skipped pool elements and associated property dimensions, while the execution processes navigate through and selectively reserve the pool elements and their associated resources; and
in response to receiving a request to reserve a particular resource with requested properties, searching the tree including the lists of skipped pool elements across the property dimensions indicated by the request, to determine a subset of the pool elements and resources in the resource pool that matches the requested properties.

12. The non-transitory computer readable storage medium of claim 11, wherein the request to reserve a particular resource specifies a range of properties associated with the particular resource to be reserved, wherein the system determines a best or partially-matching set of pool elements to return in response to the request, based on a matching of the dimension properties associated with the pool elements.

13. The non-transitory computer readable storage medium of claim 11, wherein as the execution processes access the resource pool, to selectively reserve pool elements associated with particular resources, the system stores skipped pool elements as revisit queues within the data structure.

14. The non-transitory computer readable storage medium of claim 11, wherein the resource pool is a connection pool, wherein the system operates to provide access by the execution processes to a plurality of cached connections to a database, wherein each pool element identifies a particular connection having multiple properties associated therewith.

15. The non-transitory computer readable storage medium of claim 11, wherein the resource pool is a linear wait-free pool including the plurality of pool elements.

* * * * *

UNITED STATES PATENT AND TRADEMARK OFFICE
CERTIFICATE OF CORRECTION

PATENT NO. : 11,204,813 B2
APPLICATION NO. : 17/068555
DATED : December 21, 2021
INVENTOR(S) : Dolgov et al.

Page 1 of 1

It is certified that error appears in the above-identified patent and that said Letters Patent is hereby corrected as shown below:

In the Specification

In Column 15, Line 55, after "figure)" insert -- . --.

In the Claims

In Column 16, Line 59, in Claim 1, after "processor" insert -- , --.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*